United States Patent
Okuda et al.

(10) Patent No.: US 9,905,826 B2
(45) Date of Patent: Feb. 27, 2018

(54) ELECTRIC STORAGE DEVICE AND RECHARGEABLE BATTERY

(71) Applicant: KABUSHIKI KAISHA TOYOTA JIDOSHOKKI, Kariya-shi, Aichi-ken (JP)

(72) Inventors: Motoaki Okuda, Kariya (JP); Atsushi Minagata, Kariya (JP); Hiroyasu Nishihara, Kariya (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 606 days.

(21) Appl. No.: 14/391,201

(22) PCT Filed: Apr. 11, 2013

(86) PCT No.: PCT/JP2013/060936
§ 371 (c)(1),
(2) Date: Oct. 8, 2014

(87) PCT Pub. No.: WO2013/154155
PCT Pub. Date: Oct. 17, 2013

(65) Prior Publication Data
US 2015/0099154 A1     Apr. 9, 2015

(30) Foreign Application Priority Data

Apr. 13, 2012 (JP) .................................. 2012-091982
Dec. 12, 2012 (JP) .................................. 2012-271456

(51) Int. Cl.
H01M 2/18     (2006.01)
H01M 2/02     (2006.01)
(Continued)

(52) U.S. Cl.
CPC .......... H01M 2/18 (2013.01); H01M 2/0202 (2013.01); H01M 2/0237 (2013.01);
(Continued)

(58) Field of Classification Search
CPC .... H01M 2/18; H01M 2/0202; H01M 2/0237; H01M 2/1673; H01M 10/0413; H01M 10/0436
(Continued)

(56) References Cited

U.S. PATENT DOCUMENTS

2011/0151307 A1   6/2011   Hwang et al.
2011/0195299 A1   8/2011   Hashimoto
(Continued)

FOREIGN PATENT DOCUMENTS

CN   102104128 A   6/2011
CN   102347514 A   2/2012
(Continued)

OTHER PUBLICATIONS

Communication dated Jan. 25, 2016, issued by the State Intellectual Property Office of the P.R.C. in corresponding Chinese Application No. 201380018880.9.
(Continued)

*Primary Examiner* — Jonathan Jelsma
*Assistant Examiner* — Rashid Alam
(74) *Attorney, Agent, or Firm* — Sughrue Mion, PLLC

(57) ABSTRACT

The electric storage device is provided with a case body and an electrode assembly accommodated in the case body. The electrode assembly includes positive and negative electrode sheets each having an active material layer. The case body includes at least one primary inner wall surface, at least one secondary inner wall surface, and corner surfaces. A plane that includes the boundary line between a primary inner wall surface and the corresponding corner surface and faces the
(Continued)

corresponding secondary inner wall surface is defined as an imaginary boundary plane. An edge of the active material layer of a positive electrode sheet facing the corresponding secondary inner wall surface is positioned on the surface of the imaginary boundary plane, or is positioned in a region spaced further apart from the secondary inner wall surface facing the edge than the position of the imaginary boundary plane.

14 Claims, 9 Drawing Sheets

(51) Int. Cl.
    *H01M 2/16*     (2006.01)
    *H01M 10/04*     (2006.01)

(52) U.S. Cl.
    CPC ..... *H01M 2/1673* (2013.01); *H01M 10/0413* (2013.01); *H01M 10/0436* (2013.01)

(58) Field of Classification Search
    USPC ........................................................ 429/142
    See application file for complete search history.

(56) References Cited

U.S. PATENT DOCUMENTS

| | | | | |
|---|---|---|---|---|
| 2011/0200872 A1* | 8/2011 | Kogure | ............ | H01M 10/0413 429/186 |
| 2011/0223465 A1* | 9/2011 | Kanda | ............... | H01M 10/0413 429/153 |
| 2011/0244319 A1 | 10/2011 | Hashimoto | | |
| 2011/0250486 A1 | 10/2011 | Kogure | | |
| 2012/0028100 A1 | 2/2012 | Maeda et al. | | |
| 2012/0034526 A1 | 2/2012 | Kurahashi | | |
| 2012/0321932 A1 | 12/2012 | Ise et al. | | |

FOREIGN PATENT DOCUMENTS

| | | |
|---|---|---|
| JP | 2001-85046 A | 3/2001 |
| JP | 2002-252023 A | 9/2002 |
| JP | 2007-323845 A | 12/2007 |
| JP | 2010-161244 A | 7/2010 |
| WO | 2010/113254 A1 | 10/2010 |
| WO | 2010/113268 A1 | 10/2010 |
| WO | 2010/113270 A1 | 10/2010 |
| WO | 2010/113271 A1 | 10/2010 |
| WO | 2010/113272 A1 | 10/2010 |
| WO | 2010/113273 A1 | 10/2010 |
| WO | 2011099224 A1 | 8/2011 |

OTHER PUBLICATIONS

International Preliminary Report on Patentability dated Oct. 14, 2014, issued by the International Bureau in corresponding International Application No. PCT/JP2013/060936.

* cited by examiner

ELECTRIC STORAGE DEVICE AND RECHARGEABLE BATTERY

CROSS REFERENCE TO RELATED APPLICATIONS

This application is a National Stage of International Application No. PCT/2013/060936 filed Apr. 11, 2013, claiming priority based on Japanese Patent Application Nos. 2012-091982 filed Apr. 13, 2012 and 2012-271456 filed Dec. 12, 2012, the contents of all of which are incorporated herein by reference in their entirety.

FIELD OF THE INVENTION

The present invention relates to an electric storage device and a rechargeable battery.

BACKGROUND OF THE INVENTION

Electric storage devices such as rechargeable batteries and capacitors are rechargeable and reusable and thus widely used as power sources. In general, a large capacity electric storage device has a case for accommodating an electrode assembly and the electrode assembly is accommodated within the case. Extraction of electric power from the electrode assembly is performed through electrode terminals connected to a positive electrode and a negative electrode.

The case of a rechargeable battery generally has a structure that is provided with a metal case main body and a metal lid fixed to the case main body by welding. The case main body has a rectangular cylindrical shape with a closed end. Since the case main body is formed by drawing a metal plate, four corners of the case main body do not form right angles but, for example, have round corner portions of an arcuate cross-section. A peripheral portion of the bottom is also a corner portion. Therefore, there may be a space between end faces of the electrode assembly and inner surfaces of the case main body when the electrode assembly is of a laminated type that is composed of rectangular positive electrode sheets and negative electrode sheets alternately laminated with separators sandwiched therebetween.

When the laminated-type electrode assembly is accommodated within the case main body with such space existing, a displacement between layers (between the electrode sheets and the separators) occurs due to vibration under the circumstances where the rechargeable battery is used while mounted on the vehicle, and this leads to degradation of battery performance. Further, the electrode assembly is likely to be short-circuited with the case main body. In a structure in which the electrode assembly is inserted into the case main body in the laminating direction, the displacement between the layers of the electrode assembly easily occurs at the time of the insertion of the electrode assembly.

FIG. 17 illustrates a conventional sealed lead storage battery. The electrode assembly is accommodated in a case main body (battery container) 60 via a spacer 68 in this storage battery. A positive plate terminal portion 66 and a negative plate terminal portion 67 protrude from end portions on the same side of a plate group 65 in the electrode assembly. The case main body has a rectangular tubular shape with a closed end. The spacer 68 is in close contact with side surfaces of the plate group 65.

PRIOR ART DOCUMENTS

Patent Documents

Patent Document 1: Japanese Laid-Open Patent Publication No. 2001-85046

SUMMARY OF THE INVENTION

In the storage battery of Patent Document 1, the spacer 68 is located between the side surfaces of the plate group 65, that is, end faces of the laminated layers, and inner surfaces of the case main body 60. Thus, displacement of the electrode sheets constituting the electrode assembly and short-circuits with the case main body 60 are prevented. However, the corner portions (for example, curved portions) of the case main body 60 are not taken into consideration in the storage battery of Patent Document 1. Therefore, the spacer 68 is deformed at positions opposed to the corner portions of the case main body 60 in conformity with the shape of the corner portions. Thus, pressure is locally applied to portions opposed to corner portions of the plate group 65, positive electrode sheets, negative electrode sheets, and separators, which constitute the electrode assembly, therefore leading to degradation of the battery performance. In the case of a lithium-ion battery for example, lithium is deposited particularly on a part of the positive electrode sheets, to which part pressure is locally applied, and then the function of the battery cannot be fulfilled. Not applied only to the rechargeable battery, the same problem can arise in a capacitor such as an electric double layer capacitor and a lithium-ion capacitor.

An object of the present invention is to provide an electric storage device and a rechargeable battery capable of preventing excessive force from being applied to the electrode sheets.

To achieve the foregoing objective and in accordance with a first aspect of the present invention, an electric storage device is provide that includes a case main body, an electrode assembly, and a lid body. The case main body has a bottom wall, an opening portion located on the opposite side to the bottom wall, and a plurality of side walls extending from the bottom wall toward the opening portion. The electrode assembly is accommodated in the case main body and has a layer structure, in which at least one positive electrode sheet having an active material layer, at least one negative electrode sheet having an active material layer, and a separator located between the positive electrode sheet and the negative electrode sheet are laminated. The lid body closes the opening portion of the case main body. The case main body has at least one primary inner wall surface perpendicular to the laminating direction of the electrode assembly, at least one secondary inner wall surface adjoining the primary inner wall surface and being parallel with the laminating direction of the electrode assembly, and a corner surface connecting the mutually adjacent primary and secondary wall surfaces. Where a plane including a boundary line between the primary inner wall surface and the corner surface and facing the secondary inner wall surface is defined as an imaginary boundary plane, an edge of the active material layer of the positive electrode sheet that is opposed to the secondary inner wall surface is located either on the imaginary boundary plane or in an area more distant from the secondary inner wall surface to which the edge is opposed than the position of the imaginary boundary plane.

According to this configuration, the edge of the active material layer of the positive electrode sheet can be positioned on the imaginary boundary plane or in an area more distant from the secondary inner wall surface to which the edge is opposed than the position of the imaginary boundary plane. As a result, the edge of the positive electrode sheet can be prevented from being placed over the corner surface, and the positive electrode sheet serving as an electrode sheet is prevented from receiving an excessive force.

In accordance with a second aspect of the present invention, an electric storage device is provided that includes a case main body, an electrode assembly, and a lid body. The case main body has a bottom wall, an opening portion located on the opposite side to the bottom wall, and a plurality of side walls extending from the bottom wall toward the opening portion. The electrode assembly is accommodated in the case main body and formed by laminating a plurality of positive electrode sheets having active material layers, a plurality of negative electrode sheets having active material layers, and separators each located between one of the positive electrode sheets and one of the negative electrode sheets. The lid body closes the opening portion of the case main body. The case main body has two primary inner wall surfaces perpendicular to a laminating direction of the electrode assembly and opposite from each other in the laminating direction, two secondary inner wall surfaces parallel with the laminating direction of the electrode assembly and opposite from each other in a direction orthogonal to the laminating direction, and corner surfaces each connecting adjacent ones of the primary and secondary wall surfaces. Where planes each including a boundary line between one of the primary inner wall surfaces and the corresponding corner surface and facing the corresponding secondary inner wall surface are defined as imaginary boundary planes, an edge-to-edge length of two edges of the active material layer of each positive electrode sheet that are located on opposite sides and each opposed to one of the secondary inner wall surface is a length not greater than a length obtained by subtracting a total of lengths between the secondary inner wall surfaces and the imaginary boundary planes opposed to the secondary inner wall surfaces from a surface-to-surface length between two of the secondary inner wall surfaces.

According to this configuration, the edge of the active material layer of each positive electrode sheet can be positioned on the imaginary boundary plane or in an area more distant from the secondary inner wall surface to which the edge is opposed than the position of the imaginary boundary plane. As a result, the edge of the positive electrode sheet is prevented from being placed over the corner surface, and the positive electrode sheet serving as an electrode sheet is prevented from receiving excessive force.

In accordance with a third aspect of the present invention, a rechargeable battery is provided that is equipped with the electric storage device according to any of the above aspects.

DETAILED DESCRIPTION OF THE PREFERRED EMBODIMENTS

First Embodiment

Figure 1:
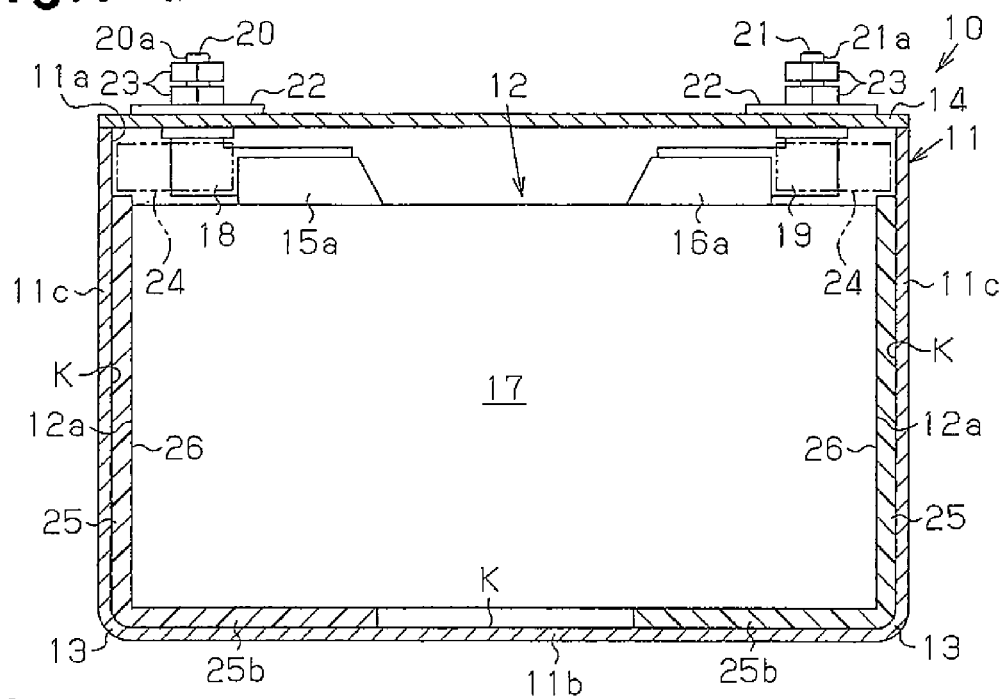
FIG. 1(a) is a schematic cross-sectional view of a rechargeable battery according to a first embodiment.
FIG. 1(b) is a schematic cross-sectional view of the rechargeable battery taken along a plane parallel with a bottom wall of a case.
FIG. 1(c) is a partially enlarged view of FIG. 1(b)
Figure 1:
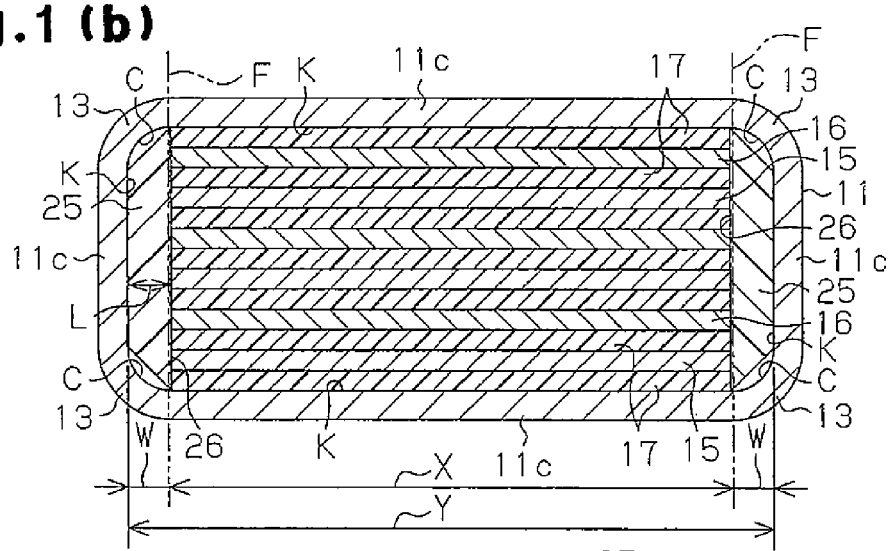
Figure 1:
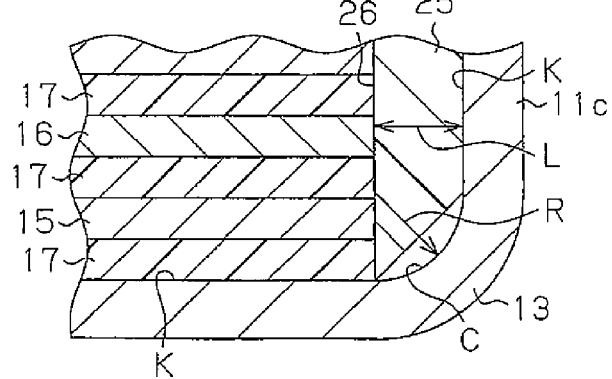

Hereinafter, a rechargeable battery according to a first embodiment of the present invention will be described with reference to FIGS. 1 and 2.

As shown in FIG. 1(a), a laminated-type electrode assembly 12 is accommodated within a case main body 11 of a rechargeable battery 10 serving as an electric storage device.

Figure 2A:
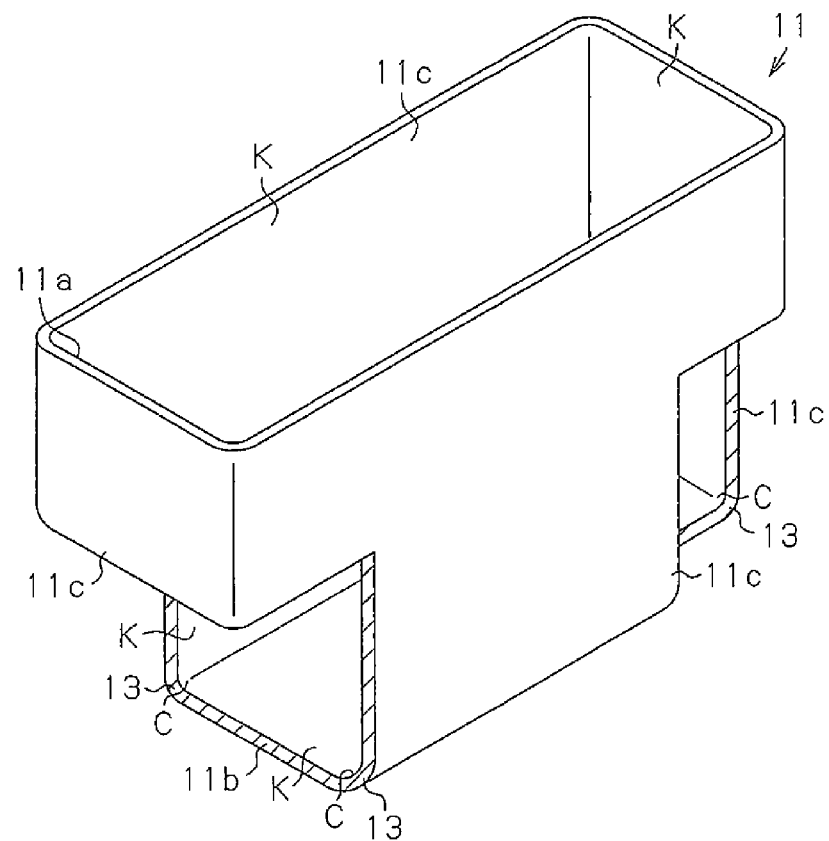
FIG. 2(a) is a perspective view, with a part cut away, illustrating a case main body.

The case main body 11 has a rectangular tubular shape with a closed end. In four corners extending from an opening portion 11a to a bottom wall 11b, the case main body 11 has curved portions (arcuate portions) 13 round in a cross-section perpendicular to a direction in which the four corners extend, as shown in FIGS. 1(b) and 1(c). In each peripheral edge of the bottom wall 11b, the case main body 11 also has a curved portion 13 round in a cross-section perpendicular to a direction in which each peripheral edge extends, as shown in FIG. 2(a). More specifically, the case main body 11 has the curved portions 13 as corner portions at parts where the bottom wall 11b and four side walls 11c adjoin each other. The case main body 11 is formed by drawing a metal plate, for example, an aluminum alloy plate. In the case main body 11 of this embodiment, adjacent inner wall surfaces K of inner wall surfaces K located inside the case main body 11 in the side walls 11c are connected together at corner surfaces C, which are wall surfaces located inside the case main body 11 at the curved portions 13. Further, in the case main body 11 of this embodiment, the inner wall surface K of each side wall 11c and an inner wall surface K located inside the case main body 11 in the bottom wall 11b are connected at the corner surfaces C.

The opening portion 11a of the case main body 11 is closed by a lid body 14. The lid body 14 is fixed to the case main body 11 by welding.

As shown in FIG. 1(b), the electrode assembly 12 has a multi-layer structure formed by alternately laminating a plurality of positive electrode sheets 15 and a plurality of negative electrode sheets 16 with a sheet separator 17 located between each positive electrode sheet 15 and the corresponding negative electrode sheet 16. That is, the electrode assembly 12 is a laminated-type electrode assembly in which the positive electrode sheets 15 and the negative electrode sheets 16 are laminated with the sheet separators 17 sandwiched therebetween. To facilitate understanding, FIG. 1(b) schematically illustrates the structure of the electrode assembly 12. The actual number of the positive electrode sheets 15 and negative electrode sheets 16 is several tens or more and the ratio of the measurements of parts also differs from the actual one.

Figure 2B:
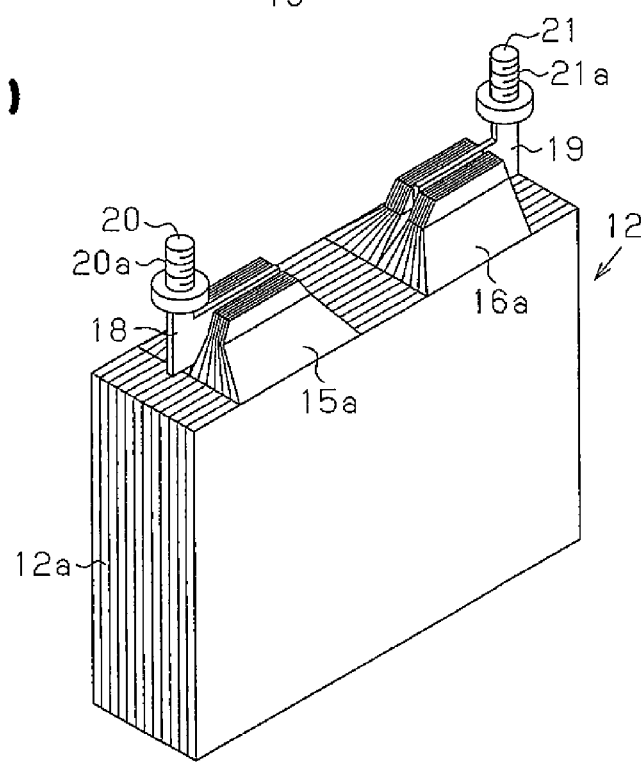
FIG. 2(b) is a schematic perspective view of an electrode assembly.

As shown in FIGS. 1(a) and 2(b), the positive electrode sheets 15 and the negative electrode sheets 16 each have a tab portion 15a, 16a protruding from a part formed with an active material layer including a rectangular part having an active material layer in which an active material (not shown) is applied to a metal foil. To the tab portions 15a serving as collector tabs in the positive electrode sheets 15, a positive electrode collector terminal 18 serving as an electrode terminal, which transfers electricity to and from the electrode assembly 12, is connected by welding. To the tab portions 16a serving as collector tabs in the negative electrode sheets 16, a negative electrode collector terminal 19 serving as an electrode terminal, which transfers electricity to and from the electrode assembly 12, is connected by welding. The positive electrode collector terminal 18 is integrated with a positive electrode terminal 20 of the rechargeable battery 10 that extends through the lid body 14. The negative electrode collector terminal 19 is integrated with a negative electrode terminal 21 of the rechargeable battery 10 that extends through the lid body 14. The positive electrode terminal 20 and the negative electrode terminal 21 have external thread portions 20a and 21a, respectively. While extending through holes (not shown) of the lid body 14, the positive electrode terminal 20 and the negative electrode terminal 21 are fastened and fixed to the lid body 14 via nuts 23 screwed to the external thread portions 20a and 21a with seal rings 22 made of electrically insulating materials located between the lid body 14 and the positive electrode terminal 20 and negative electrode terminal 21. The seal rings 22 located between the undersurface of the lid body 14 and the positive electrode terminal 20 and negative electrode terminal 21 is omitted in FIG. 1(a). Two nuts 23 are screwed to the external thread portions 20a and 21a, respectively. The lower nuts 23 are nuts for fastening the positive electrode terminal 20 and the negative electrode terminal 21 to the lid body 14, and the upper nuts 23 are for serving in fixing end portions of wires for extracting electric power (not shown) in cooperation with the lower nuts 23.

At the opening portion 11a, the case main body 11 (the upper portion of FIG. 1(a)) is provided with positioning members 24 made of electrically insulating materials (shown by long dashed double-short dashed lines in FIG. 1(a)) for creating space for arranging the positive electrode collector terminal 18 and the negative electrode collector terminal 19 in the upper portion of the case main body 11 and positioning the same. The positive electrode collector terminal 18 and the negative electrode collector terminal 19 are positioned in predetermined positions within the rechargeable battery 10 by the positioning members 24. In that state, the positive electrode terminal 20 and the negative electrode terminal 21 are fastened and fixed by the nuts 23. The electrode assembly 12 constitutes the rechargeable battery 10 together with an electrolytic solution.

In the rechargeable battery 10 of this embodiment, the laminating direction of the positive electrode sheets 15, negative electrode sheets 16, and separators 17 (hereinafter, simply referred to as the laminating direction) is a direction orthogonal to a direction from the opening portion 11a toward the bottom wall 11b of the case main body 11.

As shown in FIGS. 1(a) and 1(b), spacers 25 are located between end faces 12a the electrode assembly 12 that are parallel with the laminating direction of the positive electrode sheets 15 and negative electrode sheets 16 and are also parallel with a direction orthogonal to the opening portion 11a and the bottom wall 11b, and inner wall surfaces K of the case main body 11 opposed to these end faces 12a, that is, side walls 11c parallel with the thickness direction of the electrode assembly 12. Each spacer 25 is made of plastic and has a spacer portion 25b serving as an extension portion located between the bottom wall 11b of the case main body 11 and the electrode assembly 12. The spacer portions 25b as the extension portions extend continuously from the spacers 25.

Each spacer 25 has an abutting surface 26 abutting against the corresponding end face 12a of the electrode assembly 12. The abutting surface 26 has a width in the laminating direction not less than the thickness of the electrode assembly 12. The position of the abutting surface 26 in a direction orthogonal to the abutting surface 26 (the left-right direction in FIG. 1(b)) is the same position as the boundary position between the corner surface C and a flat surface portion of the inner wall surface K perpendicular to the laminating direction of the inner wall surfaces K of the side walls 11c in the case main body 11, or is located closer to the flat surface portion than the boundary position. This flat surface portion is a flat surface portion of the side wall 11c extending in the left-right direction in FIG. 1(b). At the position of the curved portion 13, a surface of the spacer 25 opposed to the corner surface C has a chamfered portion of a shape in conformity with the corner surface C, or at least a part of the surface of the spacer 25 opposed to the corner surface C has a chamfered portion spaced apart from the corner surface C. More specifically, in the spacer 25, a distance L from the abutting surface 26 to a place other than the corner surface C of the inner wall surface K of the case main body 11 is not less than the radius of curvature R of the curved portion 13, and a part corresponding to the curved portion 13 has a shape that does not interfere with the curved portion 13. The shape that does not interfere with the curved portion 13 refers to a shape that does not come into contact with a curved surface (the corner surface C) of the curved portion 13 or that does not receive from the curved portion 13 such a force that deforms a contacted part, if contacted.

In this embodiment, the thickness of the spacer 25 is the same as the distance L from the abutting surface 26 to a place other than the curved portion 13 of the inner wall surface K of the side wall 11c of the case main body 11. That is, the position of the abutting surface 26 in the direction orthogonal to the abutting surface 26 is located at the same position as the boundary position between the corner surface C and the flat surface portion of the inner wall surface K perpendicular to the laminating direction of the inner wall surfaces K of the case main body 11. The cross-sectional shape of the spacer 25 that is taken along the thickness direction and is orthogonal to the laminating direction is a shape such that the visible outline of the part opposed to the curved portion 13 is linear. That is, at the position of the curved portion 13, the whole of the surface of the spacer 25 opposed to the corner surface C has a chamfered portion spaced apart from the corner surface C. Specifically, the spacer 25 is formed such that the cross-sectional shape of the part opposed to the side wall 11c is trapezoidal and the part opposed to the corner surface C is a tapered surface as shown in FIG. 1(b). The cross-sectional shape of the spacer portion 25b opposed to the bottom wall 11b is also in the same shape, that is, trapezoidal, and the spacer portion 25b has a shape in which the part opposed to the corner surface C is a tapered surface. The thickness is the same as the radius of curvature R of the curved portion 13.

In the present embodiment, a plane including the boundary line between each inner wall surface K, which is perpendicular to the laminating direction of the electrode assembly 12, and the corresponding corner surface C, and facing the inner wall surface K, which is parallel with the laminating direction of the electrode assembly 12, is defined as an imaginary boundary plane F. In this case, the abutting surface 26 of each spacer 25, which is located between an end face 12a of the electrode assembly 12 and the corresponding side wall 11c, which is parallel with the thickness direction of the electrode assembly 12, is located on the corresponding imaginary boundary plane F. The position of the boundary line between the foregoing perpendicular inner wall surface K and the corner surface C is the boundary position between the inner wall surface K, which is perpendicular to the laminating direction of the electrode assembly 12, and the curved portion 13 (the corner surface C).

Each abutting surface 26 abuts against an end face 12a of the electrode assembly 12 composed of edges of active material layers of the positive electrode sheets 15, edges of active material layers of the negative electrode sheets 16, and edges of the separators 17. In other words, the edges E of active material layers of the positive electrode sheets 15 abut against the abutting surface 26 of the spacer 25 on the imaginary boundary plane F, as shown in FIG. 1(b).

The case main body 11 includes two side walls 11c each having an inner wall surface K, which is parallel with the laminating direction of the electrode assembly 12, as shown in FIGS. 1(a) and 1(b). These two side walls 11c face each other in a direction orthogonal to the laminating direction of the electrode assembly 12. The spacers 25 are each located between the end faces 12a of the electrode assembly 12 and one of the two side walls 11c. The edges E of active material layers of the positive electrode sheets 15 abut against abutting surfaces 26 of the spacers 25. Therefore, among the multiple edges E of active material layers of the positive electrode sheets 15, the edges E that face an inner wall surface K, which is parallel with the laminating direction of the electrode assembly 12, and are opposite from each other are respectively located on the corresponding imaginary boundary plane F.

The edge-to-edge length X of the edges E of active material layers of the positive electrode sheets 15 located on the imaginary boundary planes F is a length obtained by subtracting the total of lengths W between the inner wall surfaces K and the imaginary boundary planes F from the surface-to-surface length Y of the inner wall surfaces K, which is parallel with the laminating direction of the electrode assembly 12, to which inner wall surfaces K these edges E are opposed. The length after this subtraction is a width measurement of the positive electrode sheet 15 in this embodiment. The surface-to-surface length W in this embodiment is equal to the radius of curvature R of the curved portion 13.

Next, a method for assembling the rechargeable battery 10 configured as above will be described.

After a predetermined number of the positive electrode sheets 15, negative electrode sheets 16, and separators 17 are laminated, the positive electrode collector terminal 18 is connected to the tab portions 15a of the positive electrode sheets 15 by welding, and the negative electrode collector terminal 19 is connected to the tab portions 16a of the negative electrode sheets 16 by welding, and the electrode assembly 12 is formed. Subsequently, the electrode assembly 12 is held at both end faces 12a, and a pair of spacers 25 are arranged such that the spacer portions 25b abut against the lower end face of the electrode assembly 12 in FIG. 1(a). In this state, the electrode assembly 12 is inserted into the case main body 11 from the opening portion 11a from the side opposite to the protruding direction of the tab portions 15a and 16a. The electrode assembly 12 is moved and inserted into the case main body 11 in a state where the spacers 25 abut against the end faces 12a opposed to the side walls 11c of the case main body 11 with the spacer portions 25b abutting parts closer to the ends of the end face opposed to the bottom wall 11b, that is, in a state where both sides of the front end and both side surfaces of the electrode assembly 12 are covered with the spacers 25 and the spacer portions 25b at the time of the insertion of the electrode assembly 12. Accordingly, the electrode assembly 12 is smoothly inserted into the case main body 11 under the circumstances where the displacement of the positive electrode sheets 15, negative electrode sheets 16, and separators 17 is prevented. After the electrode assembly 12 is inserted to a predetermined position where the spacer portions 25b opposed to the bottom wall 11b of the case main body 11 abut against the bottom wall 11b, the positioning members 24 are arranged in predetermined positions at both sides of an upper portion of the case main body 11, and the positioning of the positive electrode collector terminal 18 and the negative electrode collector terminal 19 is performed. In this state, the lid body 14 is arranged at a position to cover the opening portion 11a of the case main body 11 such that the external thread portions 20a and 21a of the positive electrode terminal 20 and negative electrode terminal 21 extend through the holes of the lid body 14. The lid body 14 is then fixed to the case main body 11 by welding. After that, the seal rings 22 are loosely fitted to the external thread portions 20a and 21a of the positive electrode terminal 20 and negative electrode terminal 21, and then the positive electrode terminal 20 and the negative electrode terminal 21 are fastened and fixed to the lid body 14 by the nuts 23. After that, the electrolytic solution is injected into the case main body 11 from an inlet (not shown), and the rechargeable battery 10 is thus completed.

Next, operation of the rechargeable battery 10 configured as above will be described.

The rechargeable battery 10 may be used singly, but in general, is used as an assembled battery constructed by connecting a plurality of rechargeable batteries 10 in series or in parallel. The rechargeable battery 10 is used in various uses, and also used as an electric power supply of a drive motor mounted on a vehicle or an electric power supply of other electrical machinery and apparatus, for example.

When the rechargeable battery 10 is mounted on and used in a vehicle, vibration of the vehicle is applied to the rechargeable battery 10. If there are no spacers 25 or spacer portions 25b and space between the end faces 12a of the electrode assembly 12 and the wall surfaces of the case main body 11 exists, it is likely that the positive electrode sheets 15 or the negative electrode sheets 16 are displaced so that the battery performance degrades or short-circuits with the case main body 11 occur. In this embodiment, however, the spacers 25 and the spacer portions 25b exist, and therefore, the positive electrode sheets 15, negative electrode sheets 16, and separators 17 constituting the electrode assembly 12 are unlikely to be displaced. Even if the spacer portions 25b do not exist, the operation of the pair of spacers 25 prevents the displacement of the positive electrode sheets 15 and negative electrode sheets 16. However, without the spacer portions 25b, excessive force would be applied to the tab portions 15a and 16a, which have been welded to the positive electrode collector terminal 18 and the negative electrode collector terminal 19. However, with the spacer portions 25b, the application of excessive force to the tab portions 15a and 16a is prevented.

The above illustrated embodiment achieves the following advantages.

(1) The rechargeable battery 10 as an electric storage device is provided with a case main body 11, a laminated-type electrode assembly 12, and a lid body 14. The case main body 11 is of a rectangular tubular shape with a closed end. At least four corners of the case main body 11, which extend from an opening portion 11a to a bottom wall 11b, have curved portions 13, which are round in a cross-section perpendicular to the extending direction of the four corners. The laminated-type electrode assembly 12 is accommodated within the case main body 11 and formed by laminating positive electrode sheets 15 and negative electrode sheets 16 with sheet separators 17 sandwiched therebetween. The lid body 14 closes the opening portion 11a. The rechargeable battery 10 includes spacers 25 located between end faces 12a, which are parallel with the laminating direction of the positive electrode sheets 15, negative electrode sheets 16, and separators 17 and also parallel with a direction orthogonal to the opening portion 11a and the bottom wall 11b among the end faces of the electrode assembly 12, and wall surfaces of the case main body 11 opposed to the end faces 12a. Each spacer 25 includes an abutting surface 26 abutting against the end face 12a of the electrode assembly 12. The width of the abutting surface 26 in the laminating direction is not less than the thickness of the electrode assembly 12. The position of the abutting surface 26 in a direction orthogonal to the abutting surface 26 (the left-right direction in FIG. 1(b)) is the same position as a boundary position between the curved portion 13 and a flat surface portion of the wall surface perpendicular to the laminating direction of the wall surfaces (the side walls 11c) of the case main body 11, or is located closer to the flat surface portion than the boundary position. At the position of the curved portion 13, a surface of the spacer 25 opposed to the curved portion 13 has a chamfered portion of a shape in conformity with the curved portion 13 or at least a part of the surface of the spacer 25 opposed to the curved portion 13 has a chamfered portion spaced apart from the curved portion 13. Thus, the application of excessive force to the positive electrode sheets 15 and the negative electrode sheets 16 can be prevented. When the rechargeable battery 10 is applied to a lithium-ion battery, deposition of lithium especially due to the application of local pressure on the positive electrode sheets 15 is suppressed.

The advantage (1) is achieved by the position of the edges E of the positive electrode sheets 15 located on the imaginary boundary plane F. According to this configuration, the positive electrode sheet 15 is prevented from being placed over the curved portion 13 (the corner surface C), and the positive electrode sheet 15 as the electrode sheet is prevented from receiving excessive force. Further, according to the configuration of the embodiment, the arrangement of the spacers 25 also prevent displacement of the positive electrode sheets 15, negative electrode sheets 16, and separators 17, which constitute the electrode assembly 12.

(2) At each peripheral edge of the bottom wall 11b, the case main body 11 has a curved portion 13, which is round in a cross-section perpendicular to a direction in which each peripheral edge extends. Thus, the case main body 11 can be manufactured in one process step by the drawing of a metal plate, and the number of manufacturing steps is reduced.

(3) In the electrode assembly 12, the laminating direction of the positive electrode sheets 15, the negative electrode sheets 16, and the separators 17 is a direction orthogonal to a direction from the opening portion 11a toward the bottom wall 11b of the case main body 11. As a result, without the spacers 25, displacement between the positive electrode sheet 15 or the negative electrode sheet 16 and the separator 17 would easily occur at the time of the insertion operation of the electrode assembly 12 into the case main body 11. However, by inserting the electrode assembly 12 into the case main body 11 with the abutting surfaces 26 of the spacers 25 abutting against the end faces 12a of the electrode assembly 12, the insertion is easily achieved under the circumstances where the occurrence of the displacement is prevented.

(4) Each spacer 25 has an extension portion (a spacer portion 25b) located between the bottom wall 11b of the case main body 11 and the electrode assembly 12, and the extension portion extends continuously from the spacer 25. As a result, stress applied to the tab portions 15a and 16a is reduced and the durability is improved as compared with the case without the spacer portions 25b, when the rechargeable battery 10 is mounted on a vehicle and used under high vibration conditions. Further, the number of components is reduced and the assembling operation is simplified as compared with the configuration of independent spacer portions 25b.

(5) The visible outline of a part opposed to the curved portion 13 is linear in a cross-sectional shape of the spacer 25 taken along the thickness direction while being orthogonal to the laminating direction of the positive electrode sheets 15 and the negative electrode sheets 16 of the electrode assembly 12. Thus, the manufacturing is simplified as compared with the case where the shape of the spacer 25 is formed such that at least a part of the visible outline in the foregoing cross-sectional shape matches with the shape of the curved portion 13.

(6) The rechargeable battery 10 (the electric storage device) is mounted on a vehicle and used as an electric power supply. Therefore, the vehicle achieves the same advantages as the mounted rechargeable battery 10.

Second Embodiment

Next, a second embodiment will be described with reference to FIGS. 3 and 4. The second embodiment differs from the first embodiment in shapes of the case main body and the lid body. Like or the same reference numerals are given to those components that are like or the same as the corresponding components of the first embodiment, and detailed explanations are omitted.

Figure 3:
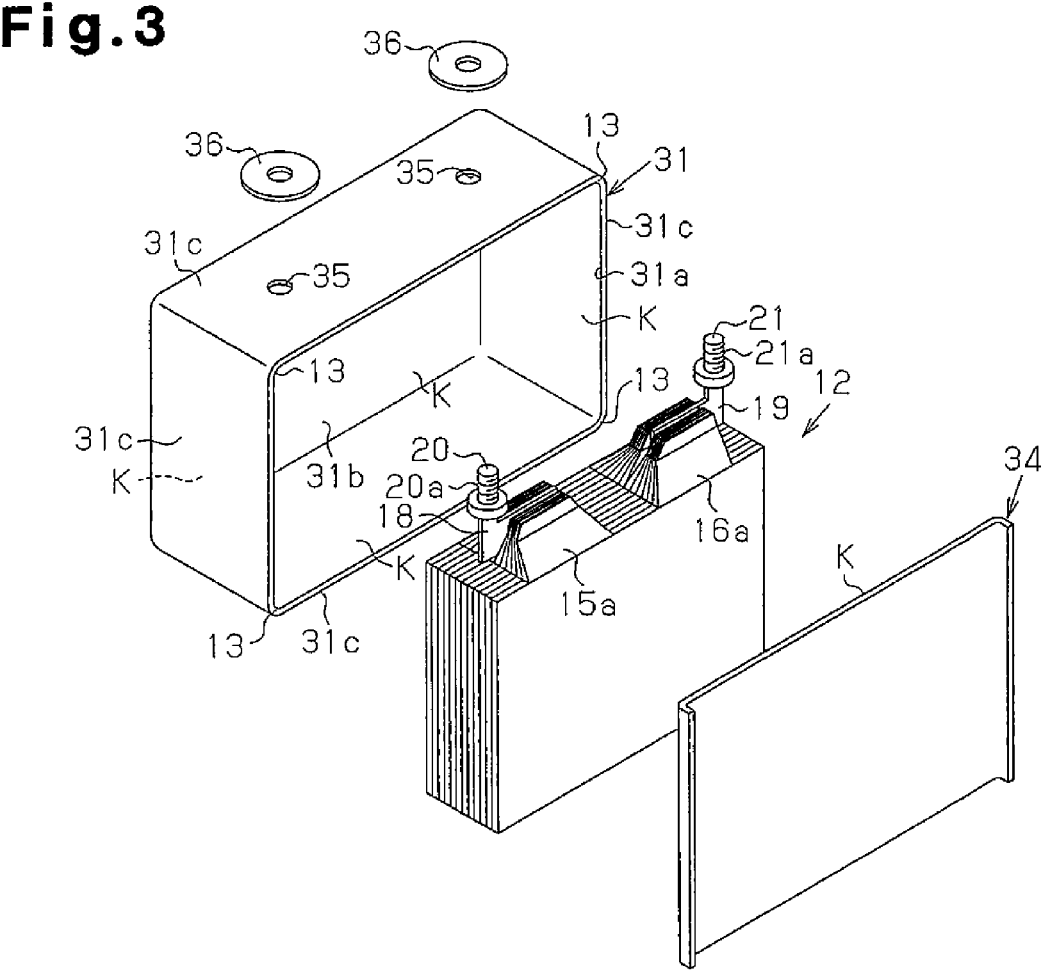
FIG. 3 is a schematic exploded perspective view of a case main body, an electrode assembly, and a lid body according to a second embodiment.
Figure 4:
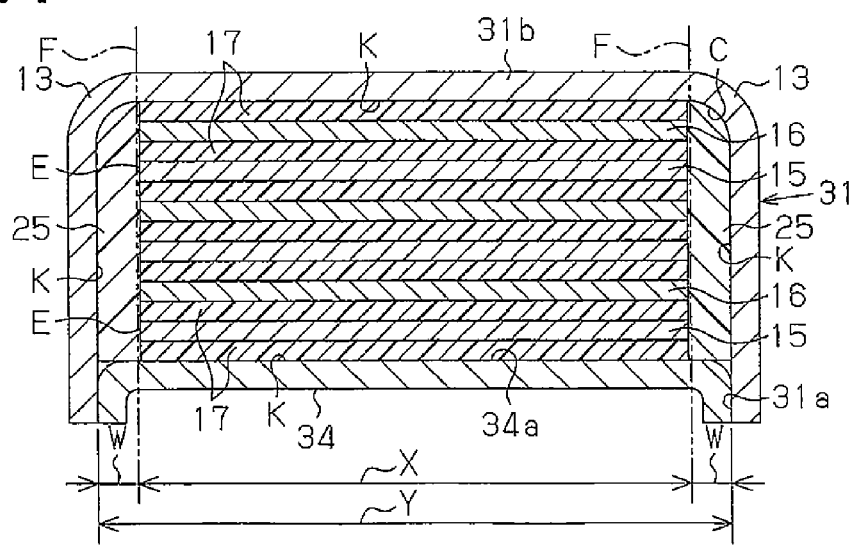
FIG. 4 is schematic cross-sectional view of the rechargeable battery taken along a plane orthogonal to a protruding direction of electrode terminals.

As shown in FIGS. 3 and 4, an opening portion 31a has a shape larger than the outer shapes of the positive electrode sheets 15, the negative electrode sheets 16, and the separators 17 of the electrode assembly 12 in a case main body 31. The case main body 31 is configured such that the electrode assembly 12 is moved in the laminating direction of the positive electrode sheets 15 and the negative electrode sheets 16 to be inserted from the opening portion 31a into the case main body 31. That is, the laminating direction of the positive electrode sheets 15 and negative electrode sheets 16 is the same direction as a direction from the opening portion 31a toward a bottom wall 31b of the case main body 31 in the electrode assembly 12.

The case main body 31 has holes 35, through which the positive electrode terminal 20 and the negative electrode terminal 21 extend. The positive electrode terminal 20 and the negative electrode terminal 21 are integrated with the positive electrode collector terminal 18 and the negative electrode collector terminal 19, which are respectively connected to the tab portions 15a and 16a of the electrode assembly 12. The positive electrode terminal 20 and the negative electrode terminal 21 are fastened and fixed to the case main body 31 by nuts screwed to the external thread portions 20a and 21a while extending through the holes 35 and seal rings 36 made of electrically insulating materials.

A lid body 34 is formed to be slightly smaller than the opening portion 31a, and a contact surface 34a with the electrode assembly 12 has a shape protruding toward the bottom wall 31b such that the positive electrode sheets 15, the negative electrode sheets 16, and the separators 17 of the electrode assembly 12 accommodated within the case main body 31 can be pressed toward the bottom wall 31b of the case main body 31. The lid body 34 is fixed to the case main body 31 by welding while the electrode assembly 12 is pressed at the contact surface 34a.

In the case main body 31 of the present embodiment, four side walls 31c extend from the bottom wall 31b toward the opening portion 31a. In the case main body 31, an inner wall surface of the bottom wall 31b and an inner wall surface of the lid body 34 are inner wall surfaces K perpendicular to the laminating direction of the electrode assembly 12, and the inner wall surfaces of the side walls 31c opposed to the end faces 12a of the electrode assembly 12 at the time when the electrode assembly 12 is accommodated in the case main body 31 are inner wall surfaces K parallel with the laminating direction of the electrode assembly 12. Further, in the case main body 31, the bottom wall 31b and the side walls 31c opposed to the end faces 12a of the electrode assembly 12 are connected at curved portions 13, and wall surfaces located inside the case main body 31 at the curved portions 13 are corner surfaces C.

In the case main body 31 of the present embodiment, a plane including the boundary line between each inner wall surface K of the bottom wall 31b and the corresponding corner surface C, and facing the inner wall surface K, which is parallel with the laminating direction of the electrode assembly 12, is defined as an imaginary boundary plane F. In this case, the abutting surface 26 of each spacer 25, which is located between an end face 12a of the electrode assembly 12 and the corresponding side wall 31c, which is parallel with the thickness direction of the electrode assembly 12, is located on the corresponding imaginary boundary plane F. Further, as shown in FIG. 4, among multiple edges E of active material layers of the positive electrode sheets 15, the edges E that face an inner wall surface K, which is parallel with the laminating direction of the electrode assembly 12, and are opposite from each other, are respectively located on the corresponding imaginary boundary plane F.

When the rechargeable battery 10 of the present embodiment is assembled, a pair of spacers 25 (shown only in FIG. 4) are arranged in such a manner that the electrode assembly 12, in which the positive electrode collector terminal 18 and the negative electrode collector terminal 19 are respectively welded to the tab portions 15a and 16a, is sandwiched at the end faces 12a. In this state, the electrode assembly 12 is inserted into the case main body 31 from the opening portion 31a. The electrode assembly 12 is inserted into the case main body 31 while the positive electrode terminal 20 and the negative electrode terminal 21 are inserted through the holes 35 with the electrode assembly 12 slightly inclined. After the electrode assembly 12 is arranged in a predetermined position of the case main body 31, the lid body 34 is welded to the case main body 31 while inserted within the opening portion 31a of the case main body 31 with the electrode assembly 12 pressed toward the bottom wall 31b. After that, the lid body 34 is fastened and fixed to the case main body 31 by nuts screwed to the external thread portions 20a and 21a of the positive electrode terminal 20 and the negative electrode terminal 21. After that, an electrolytic solution is injected to the case main body 31 from an inlet (not shown), and the rechargeable battery 10 is completed.

The spacers 25 function in the same manner as the first embodiment in the rechargeable battery 10 of this embodiment. Therefore, the present embodiment achieves the same advantages as the advantages (1), (2), (5), and (6) of the first embodiment, where the case main body 11 is read as the case main body 31, and the opening portion 11a as the opening portion 31a, and the bottom wall 11b as the bottom wall 31b. In addition to the advantages (1), (2), (5), and (6), the present embodiment achieves the following advantages.

(7) In the electrode assembly 12, the laminating direction of the positive electrode sheets 15 and the negative electrode sheets 16 is the same direction as the direction from the opening portion 31a toward the bottom wall 31b of the case main body 31. Accordingly, the size of the opening portion 31a is large as compared with that of the first embodiment, and the distance from the opening portion 31a to the bottom wall 31b, that is, the distance over which the electrode assembly 12 is moved at the time of inserting the electrode assembly 12 to the case main body 31 is short. Thus, the operation of inserting the electrode assembly 12 into the case main body 31 is simplified in assembling the rechargeable battery 10 as compared with the first embodiment.

(8) The lid body 34 is welded to the case main body 31 with the electrode assembly 12 pressed toward the bottom wall 31b. Since the positive electrode sheets 15, the negative electrode sheets 16, and the separators 17 are not flat but somewhat curved, a space exists between the positive electrode sheet 15 and the separator 17 and between the separator 17 and the negative electrode sheet 16 in a merely laminated state, which makes the electrode assembly 12 bulky. In the present embodiment, however, the positive electrode sheets 15, the negative electrode sheets 16, and the separators 17, which constitute the electrode assembly 12, are pressed by the lid body 34, and the electrode assembly 12 is accommodated within the case main body 31 without wasted space. Therefore, when the rechargeable battery 10 is mounted on and used in a vehicle, the positive electrode sheets 15, the negative electrode sheets 16, and the separators 17, which constitute the electrode assembly 12, are unlikely to be displaced even if vibration of the vehicle is applied to the rechargeable battery 10, and excessive force is prevented from being applied to the tab portions 15a and 16a welded to the positive electrode collector terminal 18 and the negative electrode collector terminal 19. Further, dead spaces are reduced and the volume energy density (capacity) of the rechargeable battery 10 is increased.

Third Embodiment

A third embodiment will now be described with reference to FIGS. 5 to 8.

Figure 5:
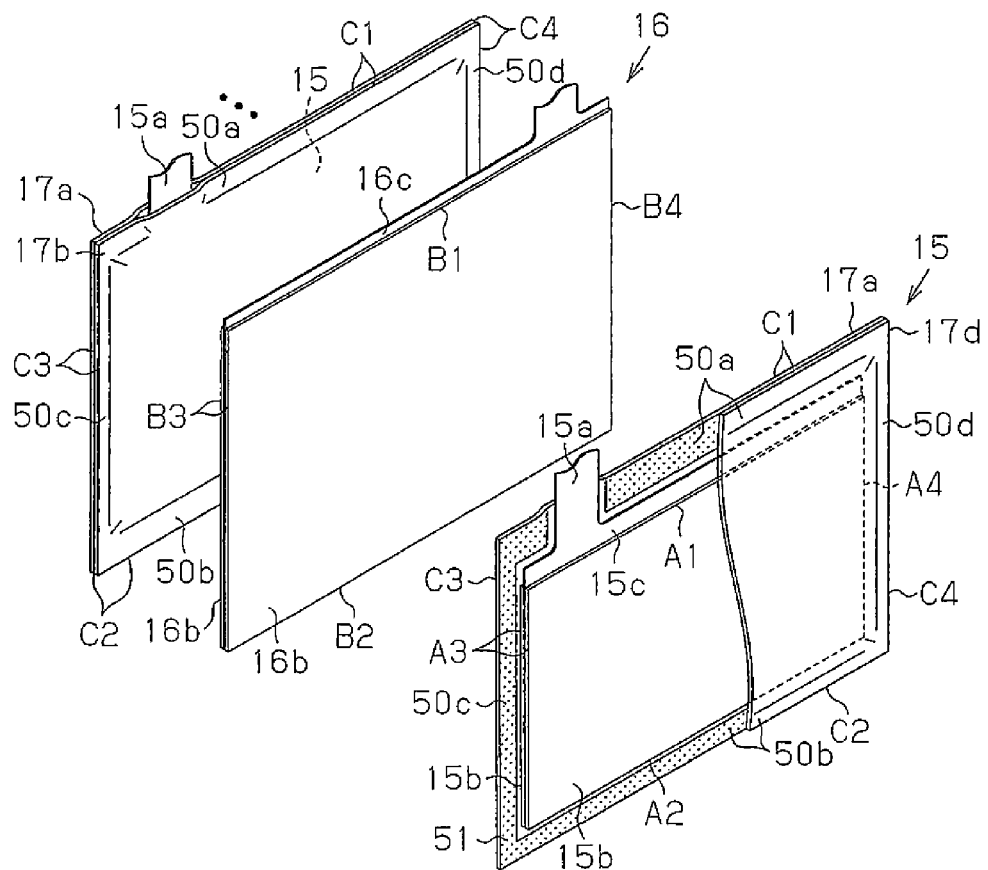
FIG. 5 is a perspective view showing positive electrode sheets, a negative electrode sheet, and separators according to a third embodiment.
Figure 6:
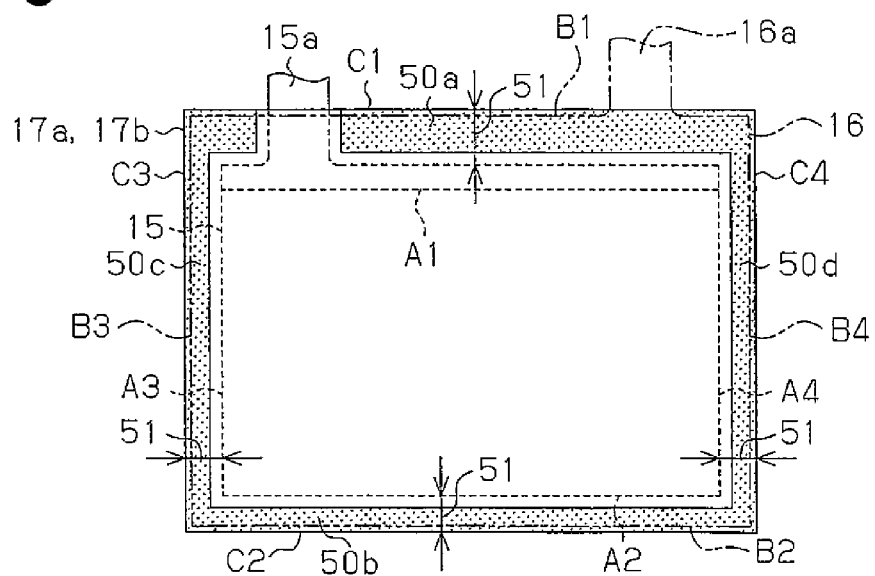
FIG. 6 is a front view showing an overlaid state of the positive electrode sheet, the negative electrode sheet, and the separator.

Like or the same reference numerals are given to those components that are like or the same as the corresponding components of the first and second embodiments, and detailed explanations are omitted As shown in FIGS. 5 and 6, except for the tab portion 15a, each positive electrode sheet 15 of the present embodiment has a rectangular shape and a rectangular positive electrode active material layer 15b serving as the active material layer on the rectangular part. Of edges A1, A2, A3, and A4 of the positive electrode active material layer 15b, the edges A2 to A4 other than the edge A1, where the tab portion 15a is located, are at the same positions of respective edges of a metal foil 15c of the positive electrode sheet 15. The edge A2 is located on the opposite side to the edge A1, where the tab portion 15a is located, and is opposed to the edge A1 in the height direction of the positive electrode sheet 15. The edges A3 and A4 adjoin the edges A1 and A2 and are located in the width direction orthogonal to the height direction of the positive electrode sheet 15 and are opposite from other in the width direction.

Except for the tab portion 16a, the negative electrode sheet 16 of the present embodiment has a rectangular shape and a rectangular negative electrode active material layer 16b serving as the active material layer on the rectangular part. Of edges B1, B2, B3, and B4 of the negative electrode active material layer 16b, the edges B2 to B4 other than the edge B1, where the tab portion 16a is located, are at the same positions of respective edges of a metal foil 16c of the negative electrode sheet 16. The edge B2 is located on the opposite side to the edge B1, where the tab portion 16a is located, and is opposed to the edge B1 in the height direction of the negative electrode sheet 16. The edges B3 and B4 adjoin the edges B1 and B2 and are located in the width direction orthogonal to the height direction of the negative electrode sheet 16 and are opposite from each other in the width direction.

The separator 17 of the present embodiment has a size that covers both surfaces of the positive electrode sheet 15, and is composed of a primary separator 17a and a secondary separator 17b of the same shape. The primary and secondary separators 17a and 17b are each in the form of a rectangular sheet. The primary and secondary separators 17a and 17b each have the same shape as the rectangular part of the negative electrode sheet 16, and have the same measurements in the height direction and the width direction of the rectangular part of the negative electrode sheet 16. In the present embodiment, the negative electrode sheet 16 and the separator 17 have slightly larger than the positive electrode sheet 15. In FIG. 6, for the purposes of illustration, a long dashed double-short dashed line showing the outline of the negative electrode sheet 16 is depicted inside the solid lines showing the outlines of the primary and secondary separators 17a and 17b in order to illustrate the negative electrode sheet 16 and the primary and secondary separators 17a and 17b respectively, but actually they coincide in the laminating direction.

The primary and secondary separators 17a and 17b each have protruding portions 50a, 50b, 50c, and 50d protruding further outward than the edges A1 to A4 of the positive electrode active material layer 15b in the state where the positive electrode sheet 15 is overlaid. The protruding portion 50a protrudes outside the edge A1. The protruding portion 50a also protrudes outside the edge of the metal foil 15c located close to the edge A1. The protruding portion 50b protrudes outside the edge A2 on the opposite side to the edge A1. The protruding portions 50c and 50d protrude outside the edges A3 and A4, which adjoin the edges A1 and A2.

Respective protruding portions 50a to 50d are joined at a joint portion 51 in the primary and secondary separators 17a and 17b. For example, welding is used for the joint between the primary and secondary separators 17a and 17b. Further, the respective protruding portions 50a to 50d of the primary and secondary separators 17a and 17b are joined in positions not overlapping with the tab portion 15a. The joint portion 51 extends at the entire periphery other than the position overlapping with the tab portion 15a. The positive electrode sheet 15 is enclosed by the primary and secondary separators 17a and 17b formed into a bag shape by the joint portion 51. Edges C1 of the primary and secondary separators 17a and 17b in the state of enclosing the positive electrode sheet 15 overlap with an edge of the metal foil 16c located close to the edge B1 of the negative electrode active material layer 16b in the state of overlaying the negative electrode sheet 16. Edges C2, C3, and C4 of the primary and secondary separators 17a and 17b respectively overlap with the edges B2 to B4 of the negative electrode active material layer 16b in the state of overlaying the negative electrode sheet 16.

Figure 7:
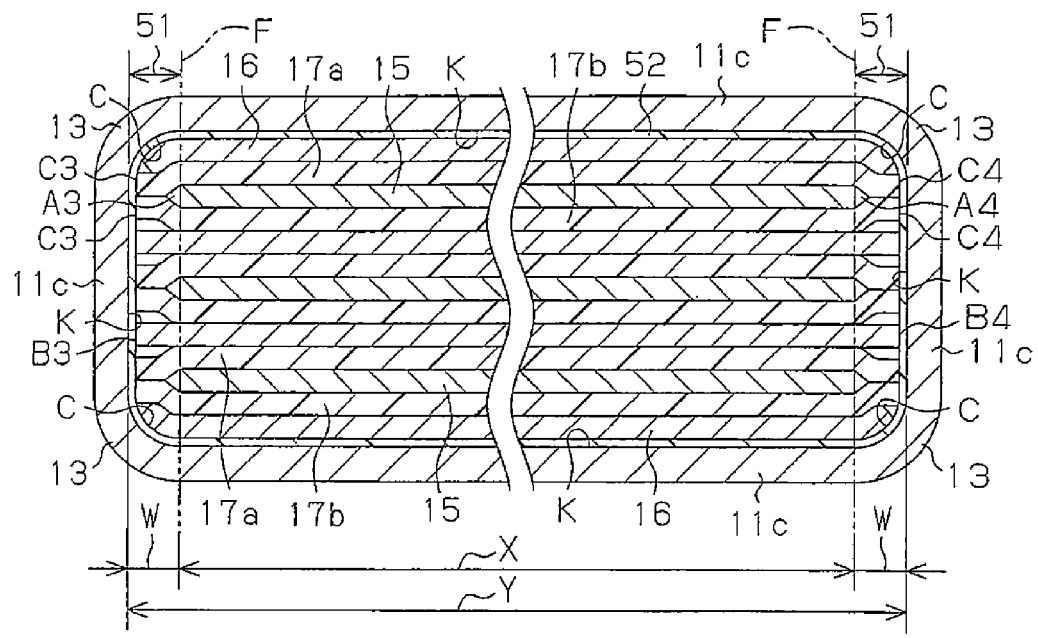
FIG. 7 is a schematic cross-sectional view of a rechargeable battery of the third embodiment taken along a plane parallel with a bottom wall of a case.
Figure 8:
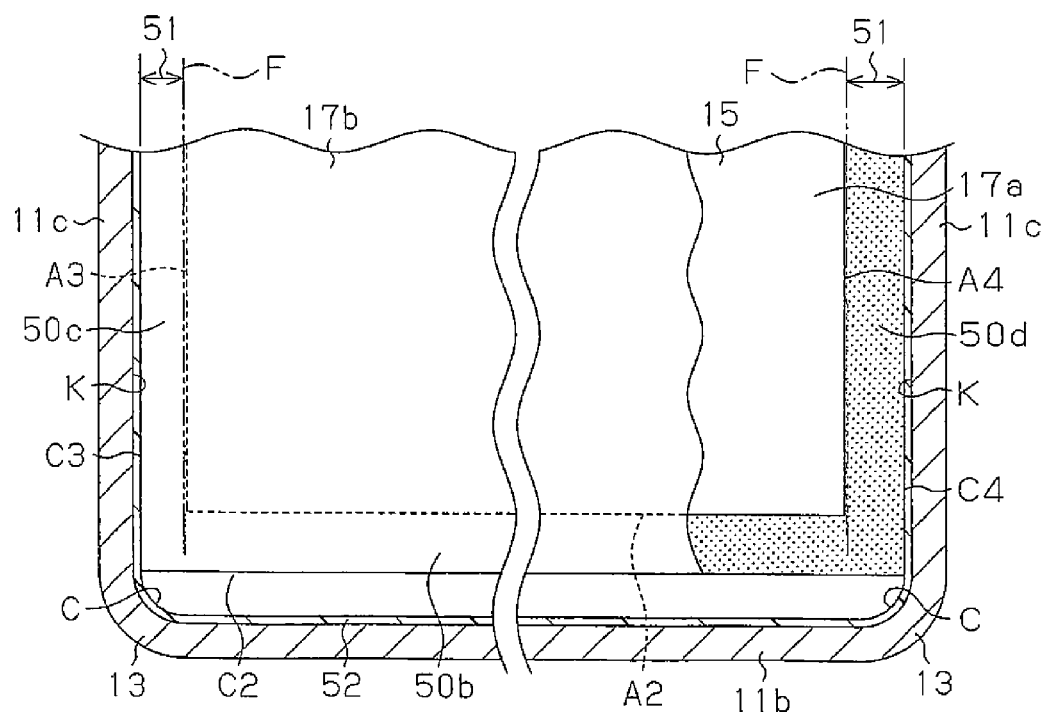
FIG. 8 is a schematic cross-sectional view of the rechargeable battery of the third embodiment taken along a plane perpendicular to the bottom wall of the case.

As shown in FIGS. 7 and 8, the electrode assembly 12, which is constructed by alternately laminating the positive electrode sheets 15 and the negative electrode sheets 16 enclosed by the primary and secondary separators 17a and 17b, is accommodated in the case main body 11. The electrode assembly 12 is configured such that the negative electrode sheets 16 are located in both outermost layers. Between the outermost negative electrode sheets 16, the positive electrode sheets 15 and the other negative electrode sheets 16 are laminated with the primary and secondary separators 17a and 17b located therebetween. In the state where the electrode assembly 12 is accommodated, the positive electrode active material layers 15b of the positive electrode sheets 15 and the negative electrode active material layers 16b of the negative electrode sheets 16 face two side walls 11c having the inner wall surfaces K perpendicular to the laminating direction of the electrode assembly 12 in the case main body 11. The edges A1, B1, C1 face the inner surface of the lid body 14 in the state where the electrode assembly 12 is accommodated. The edges A2, B2, C2 face the inner surface of the bottom wall 11b in the state where the electrode assembly 12 is accommodated. The edges A3, A4, B3, B4, C3, C4 face the two side walls 11c, which have the inner wall surfaces K parallel with the laminating direction of the electrode assembly 12 in the case main body 11 in the state where the electrode assembly 12 is accommodated.

In the present embodiment, planes that include boundary lines between the inner wall surfaces K, which are perpendicular to the laminating direction of the electrode assembly 12, and the corner surfaces C, and face the inner wall surfaces K, which are parallel with the laminating direction of the electrode assembly 12, are defined as imaginary boundary planes F. In this case, the edges A3 and A4 of each positive electrode sheet 15 are located on the imaginary boundary planes F. The edge-to-edge length X between the edges A3 and A4 of each positive electrode sheet 15 located on the imaginary boundary planes F is a length obtained by subtracting the total of lengths W between the inner wall surfaces K and the imaginary boundary planes F from the length Y between the inner wall surfaces K parallel with the laminating direction of the electrode assembly 12, to which the edges A3 and A4 are opposed. The length after this subtraction is the width of the positive electrode sheet 15 in the present embodiment. The surface-to-surface length W in the present embodiment is equal to the radius of curvature R of the curved portion 13.

In contrast, the edges B3 and B4 of each negative electrode sheet 16 and the edges C3 and C4 of the primary and secondary separators 17a and 17b are located in positions abutting against the inner wall surfaces K parallel with the laminating direction of the electrode assembly 12 in this embodiment. Therefore, the lengths in the width direction of each negative electrode sheet 16 and primary and secondary separators 17a and 17b are equal to the length Y between the inner wall surfaces K parallel with the laminating direction of the electrode assembly 12. Further, the electrode assembly 12 is accommodated in the state where an insulating film 52 insulating the case main body 11 from the electrode assembly 12 is located therebetween, as shown in FIGS. 7 and 8. As a result, each edge B3, B4, C3, C4 is not in direct contact with the inner wall surface K of the side wall 11c of the case main body 11. However, the insulating film 52 is a very thin film, so that the thickness of the insulating film 52 is not taken into consideration in the definition of the length in the width direction of each negative electrode sheet 16 and primary and secondary separators 17a and 17b in this embodiment.

The length of each joint portion 51 between the primary and secondary separators 17a and 17b is equal to the surface-to-surface length W between the inner wall surface K and the imaginary boundary plane F. Accordingly, the positive electrode sheet 15, which is enclosed by the primary and secondary separators 17a and 17b, is configured such that the edges A3 and A4 are located on the imaginary boundary planes F.

Next, operation of the rechargeable battery 10 configured as above will be described.

The edges A3 and A4 of the positive electrode sheet 15 are located on the imaginary boundary planes F. Therefore, the edges A3 and A4 of the positive electrode sheet 15 are not placed over the curved portions 13 of the case main body 11 and are positioned without overlapping with the curved portions 13 even when the electrode assembly 12 is accommodated in the case main body 11.

Further, movement of the positive electrode sheet 15 is restricted by the joint portion 51 in the state of being enclosed by the primary and secondary separators 17a and 17b. Since the radius of curvature R of the curved portion 13 is taken into consideration in the length of the joint portion 51, the positions of the edges A3 and A4 are prevented from moving to such positions where the edges A3 and A4 would be placed over the curved portions 13, and are unlikely to be displaced even when the rechargeable battery 10 is mounted on a vehicle and vibration thereof is transmitted to the rechargeable battery 10.

Therefore, according to the present embodiment, advantages described below are achieved besides the same advantages as the advantage (1) of the first embodiment.

(9) The edges A3 and A4 of the positive electrode sheet 15 are located on the imaginary boundary planes F. Thus, the positive electrode sheet 15 is prevented from being placed over the curved portions 13, and excessive force is not applied to the positive electrode sheet 15.

(10) The edges B3 and B4 of the negative electrode sheet 16 and the edges C3 and C4 of the primary and secondary separators 17a and 17b abut against the inner wall surfaces K of the side walls 11c, and the positive electrode sheet 15 is enclosed by the primary and secondary separators 17a and 17b. Consequently, the displacement of the positive electrode sheet 15, the negative electrode sheet 16, and the primary and secondary separators 17a and 17b, which constitute the electrode assembly 12, is prevented as well.

(11) Since the joint portion 51 is provided in consideration of the radius of curvature R of the curved portion 13, the positions of the edges A3 and A4 of the positive electrode sheet 15 are maintained in positions on the imaginary boundary planes F.

(12) Since the joint portion 51 is provided at the entire periphery of the positive electrode sheet 15, the movement of the positive electrode sheet 15 enclosed by the primary and secondary separators 17a and 17b is prevented. Thus, the positions of the edges A3 and A4 of the positive electrode sheet 15 are maintained at positions on the imaginary boundary planes F.

The present invention is not limited to the above embodiments, but may be modified in the following manners, for example.

Figure 9:
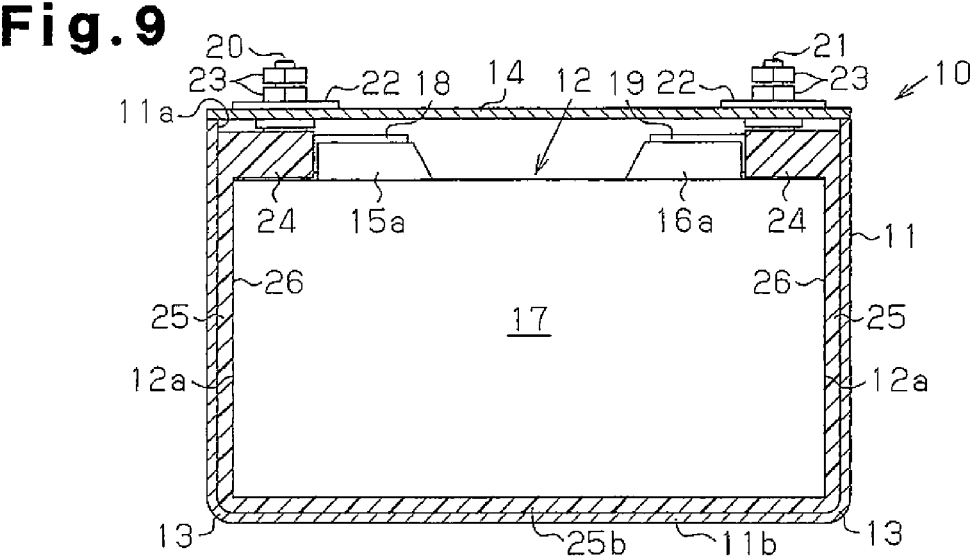
FIG. 9 is a schematic cross-sectional view corresponding to FIG. 1(a), illustrating a rechargeable battery of another embodiment.

In the rechargeable battery 10, in which the electrode assembly 12 is accommodated in the case main body 11 with the laminating direction of the positive electrode sheets 15 and negative electrode sheets 16 being orthogonal to the direction from the opening portion 11a toward the bottom wall 11b of the case main body 11, the spacers 25 are not limited to the configuration that independent ones are provided in a pair. For example, as shown in FIG. 9, a spacer portion 25b may be used that is arranged at a part abutting against the bottom wall 11b. The spacer portion 25b is formed to be continuous and integrally with a pair of spacers 25 arranged to abut against the end faces 12a on both sides of the electrode assembly 12. In this case, the operation of inserting the electrode assembly 12 to the case main body 11 together with the spacers 25 is facilitated as compared with the case of providing two independent spacers 25.

Further, as shown in FIG. 9, the spacers 25 and the positioning members 24 may be integrated. In this case, the electrode assembly 12 is inserted to the case main body 11 after the lid body 14 is assembled to the electrode assembly 12. In this state, the lid body 14 may be fixed to the case main body 11 by welding.

Figure 10:
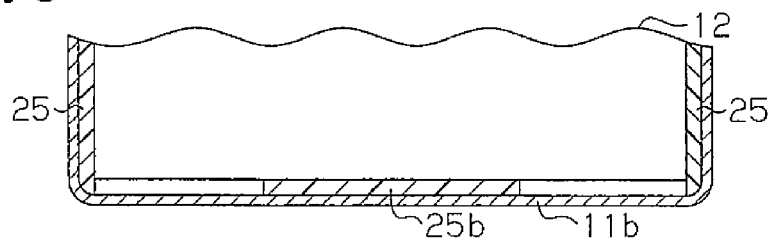
FIG. 10 is schematic partial cross-sectional view of a rechargeable battery of another embodiment.

The spacer portion 25b abutting against the bottom wall 11b is not limited to be continuous with the spacer 25, which abuts against the side wall 11c. That is, the spacer 25b need not be formed as an extension portion of the spacer 25. For example, as shown in FIG. 10, the spacer portion 25b may be provided separately at an intermediate portion of the side walls 11c, or a plurality of spacer portions 25b may be provided. In this case, first, the spacer portion 25b is arranged on the bottom wall 11b within the case main body 11 at the time of inserting the electrode assembly 12 into the case main body 11. After that, the electrode assembly 12 is inserted to the case main body 11 together with the spacers 25 with the spacers 25 arranged at both end faces 12a of the electrode assembly 12.

The width of the spacer portion 25b is not necessarily greater than or equal to the thickness of the electrode assembly 12, but may be less than the thickness of the electrode assembly 12. In this case, the positive electrode sheets 15 and the negative electrode sheets 16 include ones that do not abut against the abutting surface 26 of the spacer portion 25b. However, the positive electrode sheets 15 and the negative electrode sheets 16 are held at both sides by the spacers 25, so that the displacement is prevented.

Figure 11:
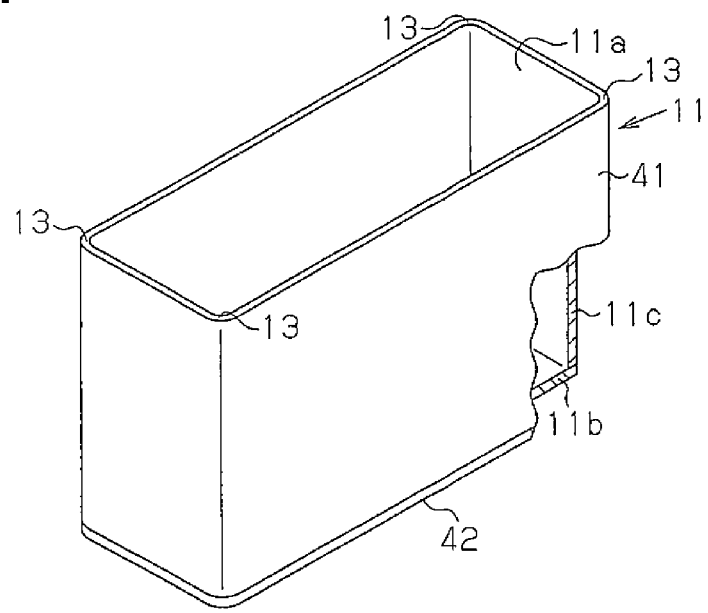
FIG. 11 is a perspective view, with a part cut away, illustrating a case main body of another embodiment.

The shape of the case main body 11 is not limited to a rectangular, tubular shape that is formed by drawing to have a closed end from the beginning. For example, as shown in FIG. 11, a rectangular tubular case main body 11 may be formed that has one end closed by welding a plate 42, which serves as the bottom wall 11b, to one end of a rectangular tubular body 41. In this case, four corners extending from the opening portion 11a toward the bottom wall 11b are each formed into the curved portions 13, and the peripheral edges of the bottom wall 11b are not formed with the curved portions 13. The side walls 11c and the bottom wall 11b form a right angle. Accordingly, the electrode assembly 12 may be covered with an insulating film and accommodated in the case main body 11 with the insulating film contacting with the bottom wall 11b. In this case, the spacer portion 25b abutting against the bottom wall 11b is unnecessary.

The case main body 11 may be formed into a rectangular tubular body in the following steps. A plate portion that is used as the bottom wall is formed to be continuous with one end of a rectangular tubular body by drawing a metal plate, and then the plate portion is bent to close an opening of the one end of the rectangular tubular body. In that state, the plate portion is fixed by welding and the rectangular tubular body is formed. In this case, a part where the plate portion is bent of the peripheral edges of the bottom wall 11b becomes the curved portion 13.

The case main body 31 may also be formed in the same manner as the case main body 11. For example, a rectangular tubular case main body 31 may be formed that has one end closed by welding a plate that is used as the bottom wall 31b to one end of a rectangular tubular body. Alternatively, a rectangular tubular body having a plate portion continuously formed at one end may be used to form the case main body 31. The plate portion in this case is used to form the bottom wall 31b.

Figure 12A:
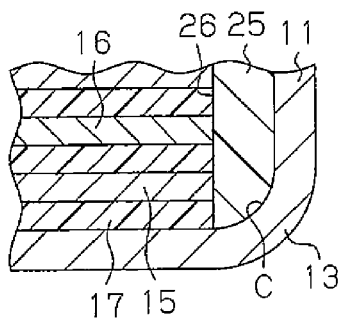
FIGS. 12(a), 12(b), and 12(c) are schematic partial cross-sectional views each showing the shape of a spacer of another embodiment.
Figure 12B:
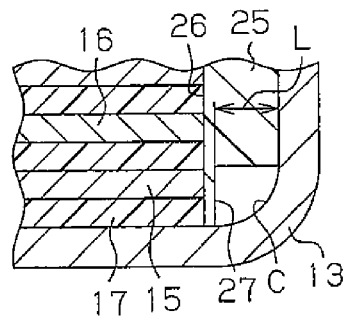
Figure 12C:
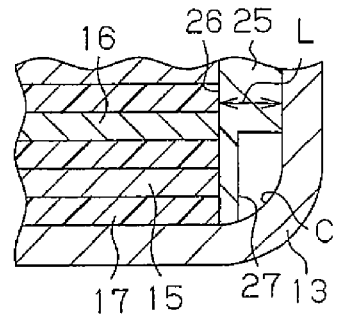

The shape of the spacer 25 at a part that corresponds to but does not interfere with the curved portion 13 is not limited to the shape of the foregoing embodiment. For example, the part may be formed into a chamfered portion having a shape in which the end portion in the width direction of the spacer 25 abuts against the entire curved portion 13, that is, a shape in which the surface of the spacer 25 opposed to the curved portion 13 is in conformity with the curved portion 13, as shown in FIG. 12(a). The thickness of the spacer 25 may be set greater than the distance L from the abutting surface 26 to the place other than the curved portion 13 of the wall surface of the side wall 11c of the case main body 11, as shown in FIG. 12(b). The spacer 25 may have a notched portion 27 at a part in the width direction of the end portion opposed to the curved portion 13 such that a place is not formed that abuts against the curved portion 13. More specifically, the position of the abutting surface 26 in the direction orthogonal to the abutting surface 26 may be located closer to the flat surface portion than the boundary position between the curved portion and the flat surface portion of the wall surface perpendicular to the laminating direction among the wall surfaces of the case main body 11, and the whole of the surface of the spacer 25 opposed to the curved portion 13 may have a chamfered portion spaced apart from the curved portion 13 at the position of the curved portion 13. As shown in FIG. 12(c), the thickness of the spacer 25 may be equal to the distance L from the abutting surface 26 to a place other than the curved portion 13 of the wall surface of the side wall 11c of the case main body 11. The spacer 25 may have a notched portion 27 at the part in the width direction of the end portion opposed to the curved portion 13 such that a part of the place abutting against the curved portion 13 remains. More specifically, the position of the abutting surface 26 in the direction orthogonal to the abutting surface 26 may be located at the same position as the boundary position between the curved portion 13 and the flat surface portion of the wall surface perpendicular to the laminating direction among the wall surfaces of the case main body 11, and a part of the surface of the spacer 25 opposed to the curved portion 13 may have a chamfered portion spaced apart from the curved portion 13 at the position of the curved portion 13. Further, not only the notched portion 27 may be at the part opposed to the curved portion 13 but also a part of the notched portion 27 may be opposed to the flat surface portion of the side wall 11c.

The separator 17 constituting the electrode assembly 12 may be bag-shaped in the first and second embodiments and modifications of FIGS. 9 to 12. The positive electrode sheet 15 and the negative electrode sheet 16 may be separately accommodated in the bag-shaped separators 17, and the separator 17 accommodating the positive electrode sheet 15 and the separator 17 accommodating the negative electrode sheet 16 may be laminated alternately. Further, a configuration in which the separator 17 accommodating the positive electrode sheet 15 and the negative electrode sheet 16 not accommodated in the separator 17 are laminated alternately. Alternatively, the separator 17 accommodating the negative electrode sheet 16 and the positive electrode sheet 15 not accommodated in the separator 17 may be laminated alternately. Namely, the shape of the separator does not matter as long as the positive electrode sheet 15 and the negative electrode sheet 16 are laminated with the sheet separator 17 sandwiched therebetween.

The electrode assembly 12 is not limited to have a configuration in which the tab portion 15a of the positive electrode sheet 15 and the tab portion 16a of the negative electrode sheet 16 protrude on the same side, but may be of a configuration in which the tab portions 15a and 16a protrude on the opposite side to each other. For example, if the side provided with the positive electrode terminal 20 and negative electrode terminal 21 of the rechargeable battery 10 are denoted as the upper side, the electrode assembly 12 may be configured such that the tab portion 15a exists on one of the left side and the right side of the electrode assembly 12 and the tab portion 16a exists on the other side. In this case, in the embodiments and modifications having the spacer 25, a part of the spacer 25 is provided with a notched portion that does not interfere with the positive electrode collector terminal 18 or the negative electrode collector terminal 19, at a part corresponding to the positive electrode collector terminal 18 or the negative electrode collector terminal 19. Thus, there is no problem even if the positive electrode collector terminal 18 and the negative electrode collector terminal 19 exist at the positions opposed to the end faces 12a.

The tab portions 15a and 16a may be omitted, and the positive electrode collector terminal 18 and the negative electrode collector terminal 19 may be welded to portions of the positive electrode sheet 15 and the negative electrode sheet 16 to which active material is not applied.

In the rechargeable battery 10 having the electrode assembly 12 in which the laminating direction of the positive electrode sheet 15 and negative electrode sheet 16 is the same direction as the direction from the opening portion 31a toward the bottom wall 31b of the case main body 31, the lid body 34 does not necessarily need to have a shape that can positively press the electrode assembly 12 by the contact surface 34a as in the second embodiment, but may be of a flat surface shape. The lid body 34 may be fixed to the case main body 31 by welding with the contact surface 34a held in contact with the electrode assembly 12. In this case, it is preferable to place a spacer between the case main body 31 and an end face of the electrode assembly 12 on the opposite side to the side where the positive electrode terminal 20 and the negative electrode terminal 21 protrude.

Figure 13:
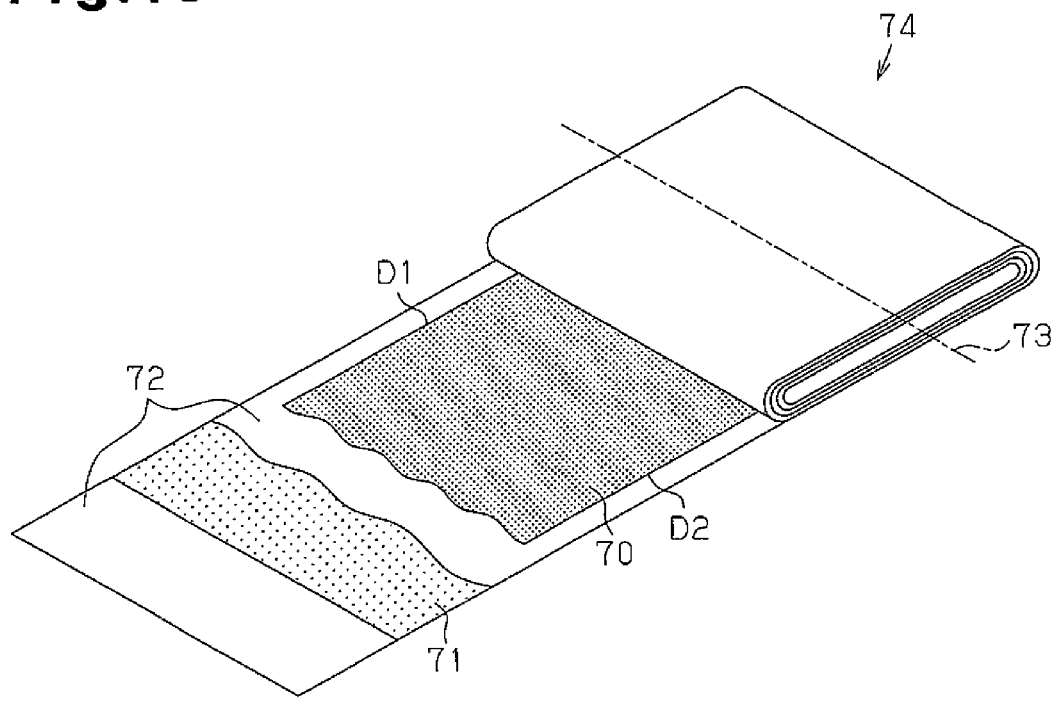
FIG. 13 is a perspective view showing a wound-type electrode assembly in another embodiment.
Figure 14:
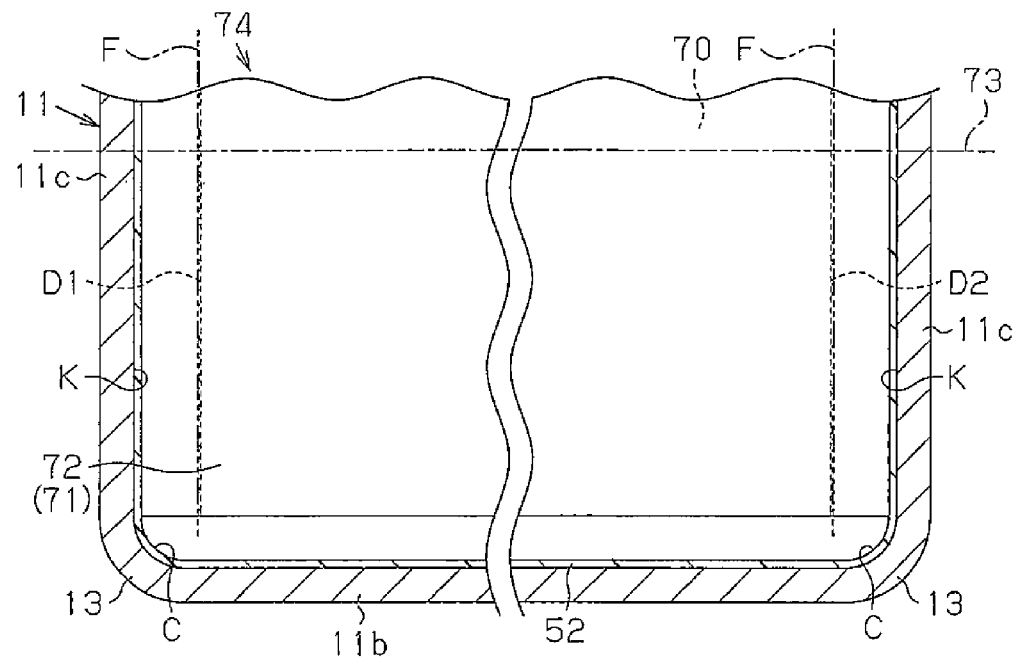
FIG. 14 is a schematic cross-sectional view taken along a plane perpendicular to the bottom wall of the case, illustrating a state in which a rechargeable battery with the wound-type electrode assembly accommodated in the case.

FIG. 13 illustrates a wound-type electrode assembly 74 that is formed by lamination in which a strip-shaped separator 72 is placed between a strip-shaped positive electrode sheet 70 and a strip-shaped negative electrode sheet 71, and winding these in a flattened shape about a winding axis 73. The electrode assembly 74 is accommodated in the case main body 11 in the same manner as each embodiment. In this modification, as shown in FIG. 14, the positions of edges D1 and D2 of an active material layer along the length of a positive electrode sheet 70 pass through boundaries between the inner wall surfaces K perpendicular to the laminating direction of the electrode assembly 74 and the corner surfaces C, and are located on the imaginary boundary planes F opposed to the inner wall surfaces K parallel with the laminating direction of the electrode assembly 74. Like this, the configuration of the third embodiment can be applied not only to the laminated-type electrode assembly 12 but also to the case where the wound-type electrode assembly 74 is accommodated in the case main body 11. In FIG. 14, the electrode assembly 74 is accommodated in the case main body 11 such that the direction in which the winding axis 73 extends is oriented in the same direction as the length between the edges D1 and D2 of the positive electrode sheet 15. Further, the laminating direction of the electrode assembly 74 is taken as a direction orthogonal to the direction from the opening portion 11a toward the bottom wall 11b of the case main body 11. Further, the edge-to-edge length X between the edges D1 and D2 of the active material layer is defined as described in the third embodiment. In this modification, the edges D1 and D2 may be located at areas more distant from the inner wall surfaces K to which the edges D1 and D2 are opposed than the positions of the imaginary boundary planes F.

Figure 15:
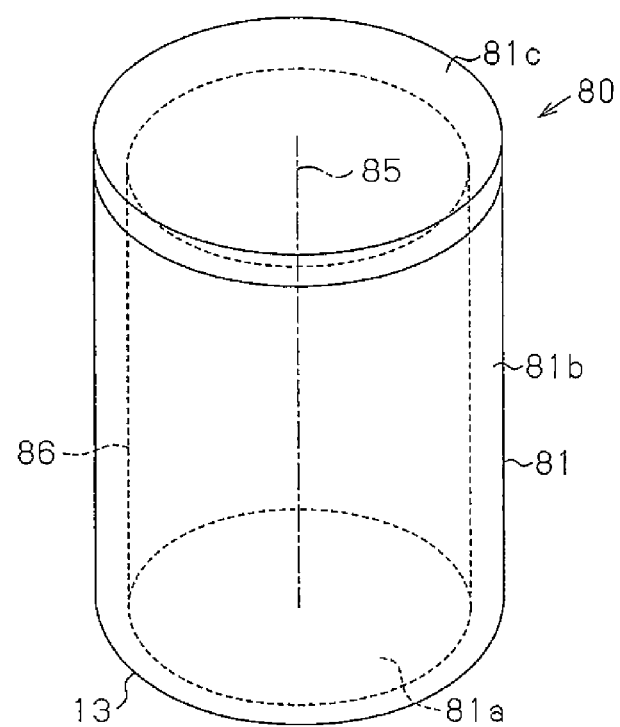
FIG. 15 is a perspective view showing the appearance of a cylindrical rechargeable battery according to another embodiment.
Figure 16:
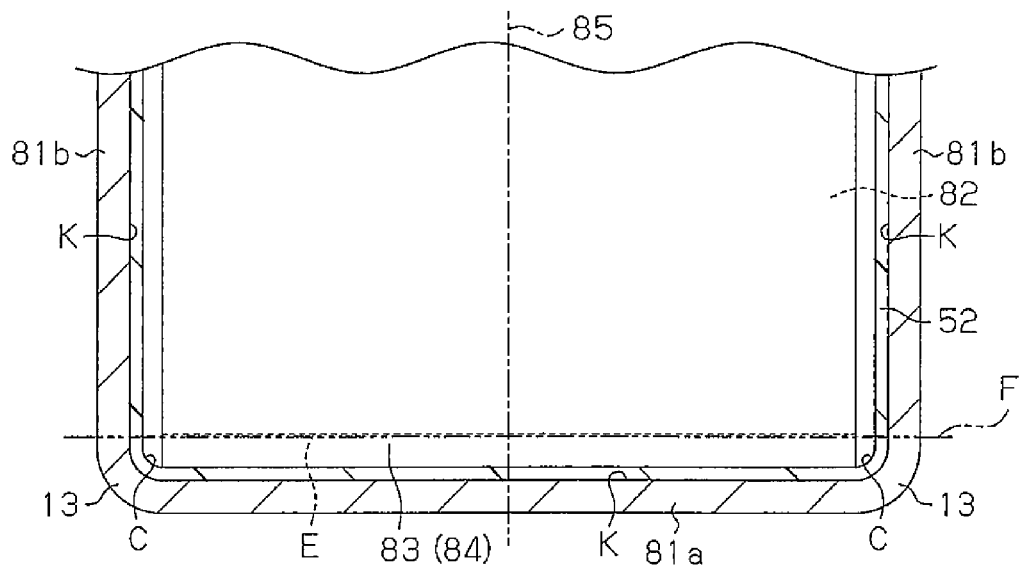
FIG. 16 is a schematic cross-sectional view of the cylindrical rechargeable battery taken along a plane perpendicular to the bottom wall of the case main body.
Figure 17:
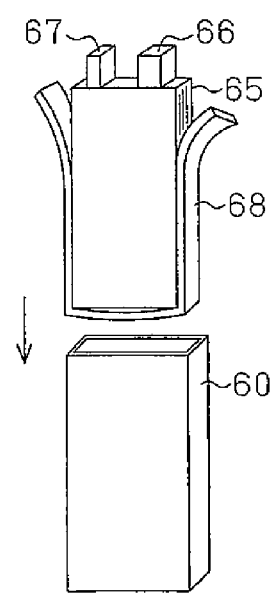
FIG. 17 is a schematic perspective view showing a conventional storage battery.

FIGS. 15 and 16 illustrate a cylindrical rechargeable battery 80. An electrode assembly 86 is formed by lamination in which a strip-shaped separator 84 is placed between a strip-shaped positive electrode sheet 82 and a strip-shaped negative electrode sheet 83, and winding these about a winding axis 85. The electrode assembly 86 is accommodated in a case main body 81 of the cylindrical rechargeable battery 80. The electrode assembly 86 may be of a cylindrical shape or a rectangular tubular shape, or may be of other shapes. A cylindrical side wall 81b is upright on a round bottom wall 81a in the case main body 81. An opening portion of the case main body 81 located on the opposite side to the bottom wall 81a is closed by a lid body 81c in the rechargeable battery 80. In the case main body 81, an inner wall surface K of the side wall 81b perpendicular to the laminating direction of the electrode assembly 86 and an inner wall surface K of the bottom wall 81a parallel with the laminating direction of the electrode assembly 86 are connected at a corner surface C, which is a wall surface inside a corner portion (curved portion 13) connecting the bottom wall 81a and the side wall 81b. In the case main body 81 of this modification, a plane including a boundary line between the inner wall surface K perpendicular to the laminating direction of the electrode assembly 86 and the corner surface C and facing the inner wall surface K parallel with the laminating direction of the electrode assembly 86 is defined as an imaginary boundary plane F. In this case, the edge E of the active material layer of the positive electrode sheet 82 opposed to the inner wall surface K of the bottom wall 81a is located on the imaginary boundary plane F at the time when the electrode assembly 86 is accommodated in the case main body 81. As just described, the configuration of the third embodiment can be applied not only to the laminated-type electrode assembly 12 but also to the case where the electrode assembly 86 of the cylindrical rechargeable battery 80 is accommodated in the case main body 81. The laminating direction of the electrode assembly 86 is a direction orthogonal to the direction from the opening portion toward the bottom wall 81a of the case main body 81. In this modification, the edge E may be located at an area more distant from the inner wall surface K to which the edge E is opposed than the position of the imaginary boundary plane F.

The modification of FIGS. 15 and 16 relates to the cylindrical rechargeable battery 80. At the time when the wound-type electrode assembly 74 described in FIGS. 13 and 14 is accommodated in the case main body 11, the configuration of the modification of FIGS. 15 and 16 can be applied similarly where the direction of the winding axis 73 is taken as the direction from the opening portion 11a toward the bottom wall 11b of the case main body 11. In other words, the edges of the positive electrode sheet are positioned on the imaginary boundary planes F, which include the boundary lines between the inner wall surfaces K perpendicular to the laminating direction of the electrode assembly 74 and the corner surfaces C and face the inner wall surface K parallel with the laminated direction of the electrode assembly 74 in the case main body 11. Alternatively, the edges of the positive electrode sheet are positioned at areas distant from the imaginary boundary planes F.

In the third embodiment, the edges A3 and A4 of the positive electrode sheet 15 may be positioned at areas more distant from the inner wall surfaces K of the side walls 11c to which the edges A3 and A4 are opposed than the positions on the imaginary boundary planes F. In this case, the length between the edges A3 and A4 of the positive electrode sheet 15 is short as compared with the case where these edges A3 and A4 are located on the imaginary boundary planes F. Further, when configured like this, the length of the joint portion 51 becomes longer than the radius of curvature R of the curved portion 13.

In the third embodiment, the position of the joint portion 51 between the primary and secondary separators 17a and 17b may be changed. Specifically, the protruding portions 50c and 50d protruding from the opposed edges A3 and A4 of the edges A1 to A4 of the positive electrode active material layer 15b of the positive electrode sheet 15 may be joined.

In the third embodiment, the primary and secondary separators 17a and 17b may be joined by using techniques other than welding. For example, bonding may be employed. In other words, the joining method is not limited to the welding as long as the positions of the edges A3 and A4 of the positive electrode active material layer 15b of the positive electrode sheet 15 are maintained at the time of accommodating the electrode assembly 12 in the case main body 11.

The separator 17 of the third embodiment may be a single separator 17 sized to cover both surfaces of the positive electrode sheet 15 when folded. The number of the joint portions 51 can be reduced when such separator 17 is employed.

In the third embodiment, the edge A1 of the positive electrode active material layer 15b of the positive electrode sheet 15 may be overlapped with the edge of the metal foil 15c. Similarly, the edge B1 of the negative electrode active material layer 16b of the negative electrode sheet 16 may be overlapped with the edge of the metal foil 16c.

The shape of the corner portions of the case main body 11 may be a chamfered shape instead of the curved shape.

The corner portions of the case main body 11 are not necessarily the same size and may have different sizes. For example, the size of the corner portions connecting the inner wall surfaces K parallel with the laminating direction of the electrode assembly 12 and the inner wall surfaces K perpendicular to the same may be different between part close to the edge A3 and a part close to the edge A4 of the positive electrode active material layer 15b of the positive electrode sheet 15.

The shape of the positive electrode sheet 15 and negative electrode sheet 16, which constitute the electrode assembly 12, is not limited to a rectangular shape as viewed from the front, but may be a square shape as viewed from the front.

The positions of the edges A1 to A4 of the positive electrode active material layer 15b and the edges of the metal foil 15c may be differentiated by making the shape of the metal foil 15c of the positive electrode sheet 15 larger than the positive electrode active material layer 15b. Similarly, the positions of the edges B1 to B4 of the negative electrode active material layer 16b and the edges of the metal foil 16c may be differentiated by making the shape of the metal foil 16c of the negative electrode sheet 16 larger than the negative electrode active material layer 16b.

For example, the configuration of the first embodiment and the configuration of the third embodiment may be combined. Specifically, the spacer 25 may be located on one side, and the edges of the negative electrode sheet 16 and separator 17 may be made to abut against the opposed wall surface on the other side. Even when thus configured, the edges A3 and A4 of the positive electrode sheet 15 can be located on the imaginary boundary planes F or at areas more distant from the inner wall surfaces K to which the edges A3 and A4 are opposed than the positions of the imaginary boundary planes F.

The vehicle is not limited to a general vehicle and forklift truck equipped with the drive motor and may be other industrial vehicles such as a shovel loader and a towing tractor, for example. Further, it is not limited to a vehicle requiring a driver and may be an automatic, guided vehicle.

The electric storage device is not limited to the rechargeable battery 10, and may be a capacitor such as an electric double layer capacitor and a lithium-ion capacitor, for example.

The following technical ideas are obtainable from the above embodiments.

In accordance with one aspect of the present invention, an electric storage device is provided that includes: a case main body, which is in a rectangular cylindrical shape with a closed end, has at least four corners extending from an opening portion toward a bottom wall, the four corners having a round shape in a cross-section perpendicular to a direction along which the four corners extend, and has a plurality of wall surfaces; an electrode assembly, which is accommodated in the case main body, is of a laminated type in which a positive electrode sheet, a negative electrode sheet, and a sheet-like separator sandwiched between the positive electrode sheet and the negative electrode sheet are laminated, and has a plurality of end faces; a lid body closing the opening portion of the case main body; and a spacer located between one end face parallel with a laminating direction of the positive electrode sheet, the negative electrode sheet, and the separator and also parallel with a direction orthogonal to the opening portion and the bottom wall among the end faces of the electrode assembly and a wall surface of the case main body opposed to the end face. The wall surface of the case main body includes a flat surface portion and a curved portion. The spacer has an abutting surface abutting against the end face of the electrode assembly. The width in the laminating direction of the abutting surface is not less than the thickness of the electrode assembly. The position of the abutting surface in a direction orthogonal to the abutting surface is the same position as a boundary position between the curved portion and the flat surface portion of the wall surface perpendicular to the laminating direction among the wall surfaces of the case main body or is located closer to the flat surface portion than the boundary position. At the position of the curved portion, a surface of the spacer opposed to the curved portion has a chamfered portion having a shape in conformity with the curved portion, or at least a part of the surface of the spacer opposed to the curved portion has a chamfered portion spaced apart from the curved portion.

In the foregoing aspect, the case main body has each peripheral edge of the bottom wall having a portion that is round in a cross-section perpendicular to a direction in which the peripheral edge extends.

In the foregoing aspect, the electrode assembly is configured such that the laminating direction of the positive electrode sheet, the negative electrode sheet, and the separator is a direction orthogonal to a direction from the opening portion toward the bottom wall of the case main body.

The foregoing aspect includes an extension portion located between the bottom wall of the case main body and the electrode assembly, and the extension portion extends continuously from the spacer.

In the foregoing aspect, the cross-sectional shape of the spacer cut in the thickness direction while being orthogonal to the laminating direction of the positive electrode sheet, the negative electrode sheet, and the separator of the electrode assembly is configured such that a visible outline of a part opposed to the curved portion is linear.

In the foregoing aspect, the electrode assembly is configured such that the laminating direction of the positive electrode sheet, the negative electrode sheet, and the separator is the same direction as the direction from the opening portion toward the bottom wall of the case main body.

The invention claimed is:

1. An electric storage device comprising:
a case main body having a bottom wall, an opening portion located on the opposite side to the bottom wall, and a plurality of side walls extending from the bottom wall toward the opening portion;
an electrode assembly accommodated in the case main body and having a layer structure, in which at least one positive electrode sheet having an active material layer, at least one negative electrode sheet having an active material layer, and a separator located between the positive electrode sheet and the negative electrode sheet are laminated; and
a lid body closing the opening portion of the case main body, wherein
the case main body has at least one primary inner wall surface perpendicular to the laminating direction of the electrode assembly, at least one secondary inner wall surface adjoining the primary inner wall surface and being parallel with the laminating direction of the electrode assembly, and a corner surface connecting the mutually adjacent primary and secondary wall surfaces,
the separator includes a primary separator and a secondary separator sandwiching the positive electrode sheet,
the primary separator covers one surface of the corresponding positive electrode sheet and has a primary protruding portion protruding further outward than an edge of the active material layer of the positive electrode sheet,
the secondary separator covers the other surface of the positive electrode sheet and has a secondary protruding portion protruding in the same direction as the primary protruding portion, and
where a plane including a boundary line between the primary inner wall surface and the corner surface and facing the secondary inner wall surface is defined as an imaginary boundary plane, the primary and secondary protruding portions are joined at positions at each of which the distance between the secondary inner wall surface and the edge of the active material layer of the positive electrode sheet opposed to the secondary inner wall surface is not less than the length between the secondary inner wall surface and the imaginary boundary plane opposed to the secondary inner wall surface in a state where the primary separator and the secondary separator sandwich the positive electrode sheet therebetween,
the negative electrode sheet and the primary and secondary separators have the same measurement in a width direction, and
edges of the negative electrode sheet and edges of the primary and secondary separators are located in positions abutting the secondary inner wall surface.

2. An electric storage device comprising:
a case main body having a bottom wall, an opening portion located on the opposite side to the bottom wall, and a plurality of side walls extending from the bottom wall toward the opening portion;
an electrode assembly accommodated in the case main body and having a layer structure, in which at least one positive electrode sheet having an active material layer, at least one negative electrode sheet having an active material layer, and a separator located between the positive electrode sheet and the negative electrode sheet are laminated; and
a lid body closing the opening portion of the case main body, wherein
the case main body has at least one primary inner wall surface perpendicular to the laminating direction of the electrode assembly, at least one secondary inner wall surface adjoining the primary inner wall surface and being parallel with the laminating direction of the electrode assembly, and a corner surface connecting the mutually adjacent primary and secondary wall surfaces,
the separator includes a primary separator and a secondary separator sandwiching the positive electrode sheet,
the primary separator covers one surface of the corresponding positive electrode sheet and has a primary protruding portion protruding further outward than an edge of the active material layer of the positive electrode sheet,
the secondary separator covers the other surface of the positive electrode sheet and has a secondary protruding portion protruding in the same direction as the primary protruding portion, and
where a plane including a boundary line between the primary inner wall surface and the corner surface and facing the secondary inner wall surface is defined as an imaginary boundary plane, the primary and secondary protruding portions are joined at positions at each of which the distance between the secondary inner wall surface and the edge of the active material layer of the positive electrode sheet opposed to the secondary inner wall surface is not less than the length between the secondary inner wall surface and the imaginary boundary plane opposed to the secondary inner wall surface in a state where the primary separator and the secondary separator sandwich the positive electrode sheet therebetween, and
edges of the negative electrode sheet and edges of the primary and secondary separators are located at the same position, and
the edges of the negative electrode sheet and the edges of the primary and secondary separators are located in positions abutting the secondary inner wall surface.

3. The electric storage device according to claim 1, wherein
the at least one secondary inner wall surface is one of two secondary inner wall surfaces, which are opposed to each other in a direction orthogonal to the laminating direction of the electrode assembly and parallel with the laminating direction of the electrode assembly, the edge of the active material layer of the positive electrode sheet is one of a plurality of edges, two of the edges are opposite from each other and each face one of the secondary inner wall surfaces, the imaginary boundary plane is one of two imaginary boundary planes, each of which is opposed to one of the two secondary inner wall surfaces, and each of the two edges is either located on the corresponding one of the two imaginary boundary planes or in an area more distant from the secondary inner wall surface to which the edge is opposed than the position of the corresponding imaginary boundary plane.

4. The electric storage device according to claim 1, wherein the primary separator and the secondary separator are each in the form of a rectangular sheet, and the primary protruding portion and the secondary protruding portion protruding further outward than the edges opposite from each other in the active material layer of the positive electrode sheet are joined with each other.

5. The electric storage device according to claim 1, wherein the primary separator and the secondary separator are each in the form of a rectangular sheet, and the primary protruding portion and the secondary protruding portion protruding further outward than the edges of the active material layer of the positive electrode sheet are joined with each other.

6. The electric storage device according to claim 1, wherein a collector tab electrically connected with an electrode terminal, which transfers electricity to and from the electrode assembly, is located at one of the edges of the active material layer of each positive electrode sheet, the primary separator and the secondary separator are each in the form of a rectangular sheet, and the primary protruding portion and the secondary protruding portion protruding further outward than the edges of the active material layer of the positive electrode sheet are joined with each other at a position where the protruding portions do not overlap with the collector tab.

7. The electric storage device according to claim 1, wherein the case main body is shaped as a rectangular box with a closed end and has four side walls extending from the opening portion toward the bottom wall, adjacent side walls are connected with each other by a corner portion, and each side wall and the bottom wall are connected with each other by a corner portion, and each corner portion that connects two side walls together extends from the opening portion toward the bottom wall and is a curved portion that is round in a cross-section perpendicular to the extending direction, and each corner portion that connects a side wall and the bottom wall extends along a corresponding peripheral edge of the bottom wall and is a curved portion that is round in a cross-section perpendicular to the extending direction.

8. A rechargeable battery equipped with the electric storage device according to claim 1.

9. The electric storage device according to claim 2, wherein the at least one secondary inner wall surface is one of two secondary inner wall surfaces, which are opposed to each other in a direction orthogonal to the laminating direction of the electrode assembly and parallel with the laminating direction of the electrode assembly, the edge of the active material layer of the positive electrode sheet is one of a plurality of edges, two of the edges are opposite from each other and each face one of the secondary inner wall surfaces, the imaginary boundary plane is one of two imaginary boundary planes, each of which is opposed to one of the two secondary inner wall surfaces, and each of the two edges is either located on the corresponding one of the two imaginary boundary planes or in an area more distant from the secondary inner wall surface to which the edge is opposed than the position of the corresponding imaginary boundary plane.

10. The electric storage device according to claim 2, wherein the primary separator and the secondary separator are each in the form of a rectangular sheet, and the primary protruding portion and the secondary protruding portion protruding further outward than the edges opposite from each other in the active material layer of the positive electrode sheet are joined with each other.

11. The electric storage device according to claim 2, wherein the primary separator and the secondary separator are each in the form of a rectangular sheet, and the primary protruding portion and the secondary protruding portion protruding further outward than the edges of the active material layer of the positive electrode sheet are joined with each other.

12. The electric storage device according to claim 2, wherein a collector tab electrically connected with an electrode terminal, which transfers electricity to and from the electrode assembly, is located at one of the edges of the active material layer of each positive electrode sheet, the primary separator and the secondary separator are each in the form of a rectangular sheet, and the primary protruding portion and the secondary protruding portion protruding further outward than the edges of the active material layer of the positive electrode sheet are joined with each other at a position where the protruding portions do not overlap with the collector tab.

13. The electric storage device according to claim 2, wherein the case main body is in a rectangular cylindrical shape with a closed end and has four side walls extending from the opening portion toward the bottom wall, adjacent side walls are connected with each other by a corner portion, and each side wall and the bottom wall are connected with each other by a corner portion, and each corner portion that connects two side walls together extends from the opening portion toward the bottom wall and is a curved portion that is round in a cross-section perpendicular to the extending direction, and each corner portion that connects a side wall and the bottom wall extends along a corresponding peripheral edge of the bottom wall and is a curved portion that is round in a cross-section perpendicular to the extending direction.

14. A rechargeable battery equipped with the electric storage device according to claim 2.

* * * * *